(12) United States Patent
Kim et al.

(10) Patent No.: US 12,304,760 B2
(45) Date of Patent: May 20, 2025

(54) SEPARATOR TENSION CONTROL DEVICE FOR STACKING SECONDARY BATTERIES

(71) Applicant: MPLUS CORP., Cheongun-si (KR)

(72) Inventors: Jong Sung Kim, Seongnam-si (KR); Seong Moon Kim, Cheongju-si (KR)

(73) Assignee: MPLUS CORP., Cheongun-si (KR)

( * ) Notice: Subject to any disclaimer, the term of this patent is extended or adjusted under 35 U.S.C. 154(b) by 305 days.

(21) Appl. No.: 17/973,534

(22) Filed: Oct. 25, 2022

(65) Prior Publication Data
US 2024/0182255 A1   Jun. 6, 2024

(51) Int. Cl.
*B65H 23/16* (2006.01)
*B65H 16/00* (2006.01)
*H01M 10/04* (2006.01)

(52) U.S. Cl.
CPC ............. *B65H 23/16* (2013.01); *B65H 16/00* (2013.01); *H01M 10/0404* (2013.01); *H01M 10/0459* (2013.01); *B65H 2402/54* (2013.01); *B65H 2404/1521* (2013.01); *B65H 2404/19* (2013.01)

(58) Field of Classification Search
CPC ... B65H 23/16; B65H 16/00; H01M 10/0404; H01M 10/0459
See application file for complete search history.

(56) References Cited

U.S. PATENT DOCUMENTS

| | | | |
|---|---|---|---|
| 10,164,234 B2 * | 12/2018 | Kishimoto | H01M 50/403 |
| 2002/0007552 A1 * | 1/2002 | Singleton | H01M 10/0413 29/730 |
| 2023/0046533 A1 * | 2/2023 | Ikeshita | H01M 10/0587 |

FOREIGN PATENT DOCUMENTS

| | | |
|---|---|---|
| KR | 10-2015-0111551 A | 10/2015 |
| KR | 10-2096934 B1 | 4/2020 |
| KR | 10-2020-0104190 A | 9/2020 |

* cited by examiner

*Primary Examiner* — Sang K Kim
(74) *Attorney, Agent, or Firm* — Insight Law Group, PLLC; Seung Lee

(57) ABSTRACT

Proposed is a separator tension control device for stacking a separator of a secondary battery, the device including a separator stacking member (110) having a separator stacking unit (112) installed on an upper surface of a table (111) such that negative and positive plates of a secondary battery are alternately stacked by a separator (132), and a fixing plate (114) which allows a separator supply member (130) and a separator dancer member (150) to be installed thereon, the separator supply member (130) installed on one side of the separator stacking unit (112) so as to supply the separator (132) to the separator stacking unit (112), and the separator dancer member (150) installed on an upper side of the separator stacking member (110) such that the separator (132) supplied from the separator supply member (130) is supplied with constant tension.

10 Claims, 16 Drawing Sheets

(a)

(b)

130

130

150

(a)

(b)

SEPARATOR TENSION CONTROL DEVICE FOR STACKING SECONDARY BATTERIES

BACKGROUND OF THE INVENTION

Field of the Invention

The present disclosure relates generally to a separator tension control device for stacking a separator of a secondary battery. More particularly, the present disclosure relates to a separator tension control device for stacking a separator of a secondary battery which allows a reciprocating separator to be always supplied in a pulled state during the supply of the separator (or a separation membrane) placed between a negative plate and a positive plate of a secondary battery such that the separator is supplied while maintaining constant tension.

Description of the Related Art

Generally, a chemical cell is a battery composed of a pair of electrodes of positive and negative plates and an electrolyte, and the amount of energy which the battery can store varies according to materials constituting the electrodes and the electrolyte.

This chemical battery is divided into a primary battery which is used only for one-time discharge due to a very slow charging reaction and a secondary battery which can be reused through repeated charging and discharging, and in recent years, the use of the secondary battery is increasing due to the advantage that the secondary battery is able to be charged and discharged.

Due to the advantage of a secondary battery, the secondary battery is being applied to various technical fields throughout the industry. The secondary battery is not only widely used as an energy source for a mobile communication device such as a smartphone, but is also attracting attention as an energy source for an electric vehicle.

This secondary battery is formed in such a manner that a positive plate, a separator, and a negative plate are sequentially stacked and immersed in an electrolyte, and there are two major methods of manufacturing the internal cell stack of the secondary battery.

In the case of a small secondary battery, a method of placing a negative plate and a positive plate on a separator and winding them to manufacture the battery of a jelly-roll type is widely used.

Meanwhile, in the case of a medium and large-sized secondary battery having a larger electric capacity, a method of stacking a negative plate, a positive plate, and a separator in an appropriate order to manufacture the battery is widely used.

Particularly, in the case of the stacking method, since punched electrode plates are mainly used, space which is between the edges of the electrode plates and the separator and into which an electrolyte permeates is relatively wide, which enables excellent battery performance.

In the stacking method of a zigzag type (also called a "z-folding" type), which is widely used among the methods of manufacturing a secondary battery cell stack in the stacking method, a separator is folded in a zigzag pattern, and a negative plate and a positive plate are alternately inserted therein to be stacked.

FIGS. 17(a) and 17(b) are view illustrating a rough configuration diagram of the process of stacking the separator of a secondary battery of the conventional technology.

FIGS. 17(a) and 17(b) show the stacking method of a representative zigzag type (also called a "z-folding" type).

FIGS. 17(a) and 17(b) illustrate a negative plate, a positive plate, and a separator stacked on a stacking table, and a separator reciprocating unit 185 installed above the stacking table continuously supplies the separator while reciprocating to apply the separator to the secondary battery on the stacking table.

In this case, a portion of the separator of the separator reciprocating unit 185 is loosely folded while the separator reciprocating unit 185 is moving to the left of the stacking table from the center thereof, and a portion of the separator of the separator reciprocating unit 185 is loosely folded while the separator reciprocating unit 185 is moving to the right of the stacking table from the center thereof.

This means that the length of the path of the separator 132 supplied by the separator reciprocating unit 185 in which an upper guide roller 156 and a lower guide roller 155 guiding the separator 132 vertically are provided is decreased and increased according to the position of the separator reciprocating unit 185. When the path is decreased, excess of the separator occurs, and though not shown in the drawing, a buffer roller is installed at the back side to accommodate the excess of the separator so as to maintain constant tension of the separator. Accordingly, a phenomenon in which the separator moves rearward is called a back phenomenon.

The movement path of the separator when such a back phenomenon occurs is different from the movement path of the separator when the separator moves forward, and thus the separator meanders, thereby deteriorating the quality of a stacked separator.

In addition, when the reaction speed of the buffer roller accommodating the separator is slow, the extra of the separator cannot be accommodated immediately, and thus tension hunting in which the separator becomes tension of 0 and then has constant tension occurs, which has a negative effect on electrode plate stacking. Accordingly, in order to solve this stacking quality deterioration problem of a secondary battery, a need to prevent the back phenomenon has emerged.

A phenomenon in which the back phenomenon occurs according to positions shown in FIGS. 17(a) and (b) will be described. In FIG. 17(a), the separator reciprocating unit 185 performs one work of supplying one separator 132 by moving from the position of ① to the position of ④, and a negative plate and a positive plate are sequentially placed on 로 the separator 132 and the separator 132 is pressed by a mandrel 180. In FIG. 17(b), moving back in reverse order, the separator reciprocating unit 185 moves from ⑤ position, which is the same position as the position of ④, to the position of ⑧ and performs one work of supplying another separator 132.

In this case, looking at a relationship between the separator reciprocating unit 185 at ① position and the mandrel 180, the separator reciprocating unit 185 at ① position is located at a fixed position to the left, and the mandrel 180 presses the separator 132 with predetermined pressure such that the separator 132 is not pulled to the separator reciprocating unit 185. The separator 132 which is located between the separator reciprocating unit 185 at ① position and the mandrel 180 and is connected thereto is in a state in which predetermined tension is applied to the separator 132.

However, when the separator reciprocating unit 185 moves from ① position to ② position, a portion of the separator 132 between the separator reciprocating unit 185 ① and the mandrel 180 is momentarily loosed due to shortening of a length between the separator reciprocating unit 185 ②and the mandrel 180 although the supply part of the separator 132 of the separator reciprocating unit absorbs a portion of tension of the separator, and accordingly, a phenomenon (hereinafter, referred to as the back phenomenon) in which the tension of the separator 132 is released occurs.

In this case, the tension of the separator 132 is released and the separator 132 may be moved from a position at which the separator 132 is in contact with the lower guide roller 155 such that the position of the separator 132 is changed, and tension applied to the separator 132 is increased or decreased according to the position of the separator 132, so the separator 132 is wrinkled and slanted.

When the work progresses and the separator reciprocating unit 185 moves from the position of ② to the position of ③, the separator 132 supplied through the separator reciprocating unit 185 gradually increases speed from the stopped state of the separator 132 at the mandrel 180 and is supplied at a similar uniform rate until the separator reciprocating unit 185 reaches the position of ④.

However, after the mandrel 180 presses the separator 132, the process shown in FIG. 17(*a*) is reversed and is repeated in the same way as shown in FIG. 17(*b*), and the phenomenon (hereinafter, referred to as the back phenomenon) in which the tension of the separator is released continuously occurs every time.

That is, since the movement speed of the separator reciprocating unit 185 is gradually increased by a consumer's demand, occurrence of the phenomenon (hereinafter, referred to as the back phenomenon) in which a portion of a separator supplied through the separator reciprocating unit 185 loosely folded and the tension of the separator is released gradually increases, and this deteriorates the quality of a secondary battery. Accordingly, to solve this problem, a need to prevent the back phenomenon has emerged.

For another example, Patent Document 1 below discloses "METHOD AND APPARATUS FOR STACKING ELECTRODE PLATE OF PRISMATIC SECONDARY BATTERY".

According to method and apparatus for stacking an electrode plate of a prismatic secondary battery disclosed in Patent Document 1 below, in the apparatus for stacking an electrode plate of a prismatic secondary battery in which a separator is placed between a positive plate and a negative plate with the positive plate and the negative plate being alternately supplied on a stack base, the stack base reciprocates between the supply position of the positive plate and the supply position of the negative plate. The apparatus includes four stack grippers (each of the stack grippers having a grip part which can swing) which are arranged to be adjacent to the edges of the plates supplied on the stack base and reciprocate together with the stack base. The four stack grippers are operated by being synchronized in two pairs, and electrode plates supplied to the upper side of the stack base are gripped by a pair of grip parts provided in a pair of stack grippers located on the front end of the stack base in a rearward moving direction thereof among the four stack grippers. The apparatus further includes a forward/rearward movement actuator which moves the stack grippers forward or rearward, and a swing actuator which swings the grip parts up or down.

Patent Document 2 below discloses "DEVICE FOR STACKING ELECTRODE PLATE FOR SECONDARY BATTERY".

A device for stacking electrode plates for a secondary battery disclosed in Patent Document 2 includes: a transport part with a suction conveyor for moving an electrode plate along a transfer line by suctioning the electrode plate for a secondary battery with vacuum pressure; an arm division rotator which allows pickup arms to pick up electrode plates from an electrode plate stack magazine on which multiple sheets of electrode plates are stacked with the plurality of pickup arms arranged radially relative to a center thereof; a rotor unit for first electrode plate separation operation so that only one sheet of electrode plate remains on the pickup arms due to rotational inertia in a case in which multiple electrode plates are picked up together when picking up an electrode plate on the electrode plate stack magazine by the pickup arms of the arm division rotator; a vibration unit for second electrode plate separation operation which prevents more than one electrode plate from being attached to the pickup arms by applying vibration to the arm division rotator by the rotor unit; and an electrode plate drop unit for a third electrode plate separation operation which transfers only one electrode plate on the suction conveyor and separates the remaining electrode plates when the electrode plates are transferred in a state of being suctioned on the suction conveyor by the pickup arms of the arm division rotator.

Documents of Related Art (Patent Document 1) Korean Patent Application Publication No. 10-2020-0104190
(Patent Document 2) Korean Patent Application Publication No. 10-2015-0111551
(Patent Document 3) Korean Patent No. 10-2096934

SUMMARY OF THE INVENTION

Accordingly, the present disclosure has been made keeping in mind the above problems occurring in the related art, and the present disclosure is intended to propose a separator tension control device for stacking a separator of a secondary battery in which the tension of a separator can be maintained to be constant by a dancer member moving horizontally to alternately stack a negative plate and a positive plate.

In addition, the present disclosure is intended to propose a separator tension control device for stacking a separator of a secondary battery which prevents a phenomenon (hereinafter, referred to as a back phenomenon) in which the tension of a separator is released since the separator passing through the dancer member which horizontally reciprocates side to side is loosened.

Furthermore, the present disclosure is intended to propose a separator tension control device for stacking a separator of a secondary battery in which the separator passing through the dancer member can maintain constant tension such that the separator is maintained tight.

In order to achieve the above objectives, according to one aspect of the present disclosure, there is provided a separator tension control device for stacking a separator of a secondary battery, the device including: a separator stacking member 110 having: a separator stacking unit 112 installed on an upper surface of a table 111 such that negative and positive plates of a secondary battery are alternately stacked by a separator 132; and a fixing plate 114 which allows a separator supply member 130 and a separator dancer member 150 to be installed thereon; the separator supply member 130 installed on one side of the separator stacking unit 112 so as to supply the separator 132 to the separator stacking unit 112; and the separator dancer member 150 installed on an upper side of the separator stacking member 110 such that the separator 132 supplied from the separator supply member 130 is supplied with constant tension.

The separator supply member 130 may include: a separator supply unit 131 which unwinds the separator 132 wound in a shape of a roll; and a tension control unit 141 installed on one side of the separator supply unit 131 so as to control tension of the separator 132 supplied to the separator dancer member 150.

The separator supply unit 131 may include: the separator 132 wound in a shape of a roll; an air shaft 133 installed rotatably on the fixing plate 114 such that the separator 132 is attached to and detached from the air shaft 133; a drive motor 134 installed on one side of the air shaft 133 so as to rotate the air shaft 133 at constant speed; a driving pulley 135 which transmits rotational force of the drive motor 134; a driven pulley 136 which receives rotational force of the driving pulley 135; and a first guide roller 138 and a second guide roller 139 installed by being spaced apart by a predetermined distance from the air shaft 133 to guide movement of the separator 132 unwound from the roll of the separator 132.

The tension control unit 141 may include: a fixing bracket 142 installed on the fixing plate 114; a cylinder 143 installed rotatably on the fixing bracket 142; a piston 144 installed in the cylinder 143 such that the piston 144 moves into and out of the cylinder 143; a rotating rod 145 installed to be rotated by the inward and outward movement of the piston 144; a rotating shaft 146 installed on the fixing plate 114 such that the rotating shaft 146 is rotated by the rotating rod 145; a pair of rotating brackets 147 installed on the rotating shaft 146; and a rotating roller 148 installed rotatably on the pair of rotating brackets 147.

The separator dancer member 150 may include: a dancer unit 151 installed on the fixing plate 114 such that the dancer unit 151 is rotated by a predetermined limited angle such that the separator 132 moved from the separator supply member 130 maintains constant tension; a tension elastic unit 161 installed on one side of the dancer unit 151 such that the dancer unit 151 is rotated clockwise and counterclockwise by the predetermined limited angle by elasticity of the tension elastic unit 161 such that the tension of the separator 132 is maintained; and a dancer tension control unit 171 installed on one side of the tension elastic unit 161 such that the elasticity of the tension elastic unit 161 is controlled.

The device may further include: a cylinder containing compressed gas such that the dancer unit 151 is rotated clockwise and counterclockwise by the predetermined limited angle such that the tension of the separator 132 is maintained.

The dancer unit 151 may include: a pair of dancer fixing plates 152 installed to be spaced apart by a predetermined distance from each other; an upper guide roller 154 installed on upper parts of the pair of dancer fixing plates 152 such that the separator 132 is pulled horizontally by a predetermined distance by the rotation of the dancer unit 151; a lower guide roller 155 installed on lower parts of the pair of dancer fixing plates 152 such that the separator 132 is pulled horizontally by a predetermined distance by the rotation of the dancer unit 151; and a dancer stopper 159 installed on the dancer fixing plate 152 such that the dancer unit 151 is rotated at the predetermined limited angle.

The tension elastic unit 161 may include: an outer fixing bracket 162 installed a dancer fixing plate 152 of the dancer unit 151; a spring casing 164 which is rotatably installed inside the outer fixing bracket 162 and has a spring fixing groove part 164a such that a spring fixing end 165b of a spiral spring 165 is coupled to the spring fixing groove part 164a; the spiral spring 165 installed inside the spring casing 164 so as to rotate the dancer unit 151 by a limited angle; and a spring fixing shaft 168 having a spring fixing groove part 168a such that a spring free end 165a formed on an end of the spiral spring 165 is coupled to the spring fixing groove part 168a, the spring fixing shaft 168 being installed through the spiral spring 165 such that the spring fixing shaft 168 is rotated by the dancer tension control unit 171.

The dancer tension control unit 171 may include: a dancer fixed shaft 172 fixed elastically to a spring fixing shaft 168 via a spiral spring 165 and a spring casing 164 so as to control elasticity of the spiral spring 165 installed in the tension elastic unit 161; a control knob 174 installed on the dancer fixed shaft 172 so as to rotate the dancer fixed shaft 172; a fixing gear 177 installed on the dancer fixed shaft 172 so as to maintain a rotated state of the dancer fixed shaft 172; and a fixing stopper 178 installed on an upper part of the fixing gear 177 so as to prevent rotation of the fixing gear 177 rotated by the control knob 174.

The separator dancer member 150 may include: a dancer unit 151 installed on the fixing plate 114 such that the dancer unit 151 is rotated by a predetermined limited angle such that the separator 132 moved from the separator supply member 130 maintains constant tension; a dancer tension elastic unit 190 installed on one side of the dancer unit 151 such that the dancer unit 151 is rotated clockwise and counterclockwise by the predetermined limited angle by elasticity of the dancer tension elastic unit 190 such that the tension of the separator 132 is maintained; and a tension spring 200 installed on one side of the dancer tension elastic unit 190 such that the elasticity of the dancer tension elastic unit 190 is controlled.

The tension spring 200 may be mounted to an upper right side surface of a dancer fixing bracket 156, and another tension spring 200 may be mounted to a lower left side surface of the dancer fixing bracket 156 such that the pair of tension springs 200 having equal tension is mounted thereto relative to a rotating shaft of the dancer fixing bracket 156, so the equal tension may be in balance with torque applied to an upper roller 157 and a lower roller 158 from the separator 132.

In the separator dancer member 150, a dancer unit 151 may be efficiently rotated by the separator 132 and may be rapidly restored, the dancer unit 151 being made of a lightweight carbon fiber material such that the dancer unit 151 is rapidly operated by compression force and restoring force of a spiral spring 165.

As described above, according to the separator tension control device for stacking a separator of a secondary battery of the present disclosure, the rotation of the dancer unit caused by the separator is rapidly performed due to the compression and decompression of the spiral spring, and the tension of the separator is maintained by the elasticity of the spiral spring such that a portion of the separator can be moved and supplied at a tight state without being loosened, thereby preventing the defect of a secondary battery due to the folding of the separator.

According to the separator tension control device for stacking a separator of a secondary battery of the present disclosure, it is possible to always move the separator in a taut state by the tension control unit, to supply a separator having desired tension by the forward and rearward movements of the tension control unit, to maintain the dancer unit at a precise position by the compression force and restoring force of the spiral spring, to rapidly restore the separator dancer member to an initial position thereof by the spiral spring, and to control the torque of the spiral spring by the dancer tension control unit.

According to the separator tension control device for stacking a separator of a secondary battery of the present disclosure, it is possible to reduce weight of the separator dancer member since the separator dancer member is made of a lightweight carbon fiber material, and it is possible to operate the dancer unit more rapidly by the compression force and restoring force of the spiral spring since the dancer unit is made of a lightweight carbon fiber material, thereby preventing a portion of the separator from being loosened.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, with reference to the accompanying drawings, embodiments of the present disclosure will be described in detail so that those skilled in the art can easily implement them.

However, since the description of the present disclosure is merely for structural or functional explanation, the scope of the present disclosure should not be construed as being limited by the embodiments described in the present specification.

For example, it should be understood that the scope of the present disclosure includes equivalents capable of realizing the technical idea of the present disclosure since the embodiments may be modified variously and may have various forms.

In addition, the scope of the present disclosure should not be construed as being limited to a specific embodiment since objectives or effects presented in the present disclosure do not mean that the specific embodiment should include all of them or only such effects.

In this specification, the present embodiments are provided so that the present disclosure is complete, and to fully inform those skilled in the art to which the present disclosure pertains of the scope of the invention. In addition, the invention is only defined by the scope of the claims.

Thus, in some embodiments, well-known components, well-known operations, and well-known techniques have not been specifically described to avoid obscuring the present disclosure.

Meanwhile, the meaning of the terms described in the present disclosure is not limited to the dictionary meaning, and should be understood as follows.

All terms used herein have the same meaning as commonly understood by those skilled in the art to which this invention belongs, unless otherwise defined.

Terms defined in a commonly used dictionary should be interpreted as having meaning consistent with the context of the related art, and cannot be interpreted as having an ideal or excessively formal meaning unless explicitly defined in the present disclosure.

Hereinafter, a separator tension control device for stacking a separator of a secondary battery according to the exemplary embodiment of the present disclosure will be described in detail with reference to the accompanying drawings.

Figure 1:
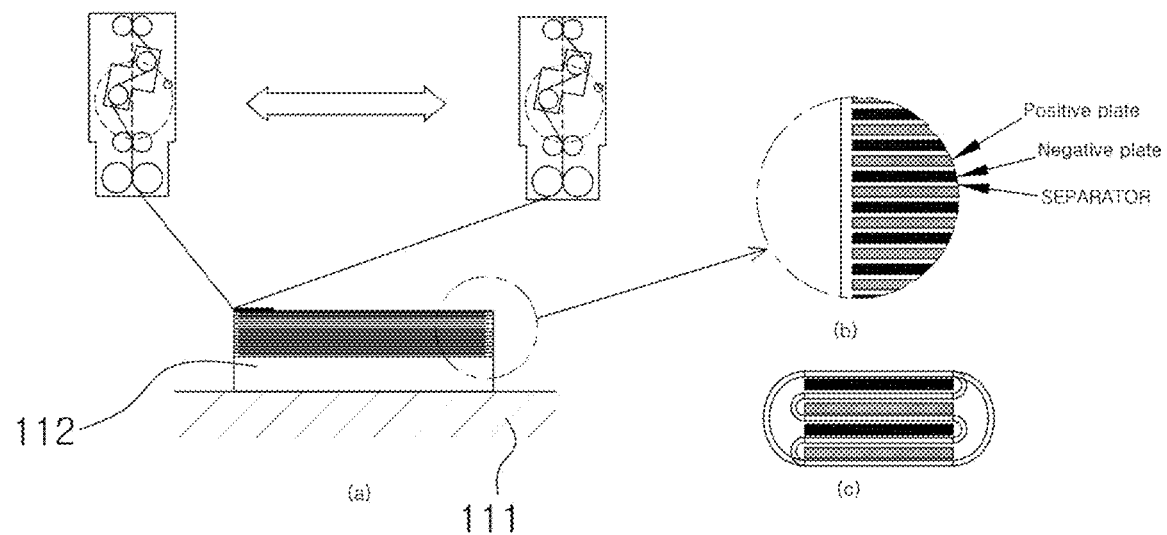
FIG. 1 is a view roughly illustrating a stacked separator of a secondary battery.

FIGS. 1(a), 1(b), and 1(c) FIGS. 1(a), 1(b), and 1(c) are views roughly illustrating a state in which a negative plate, a positive plate, and a separator are stacked.

As illustrated in FIG. 1(a), the separator is installed in a zigzag pattern between the negative plate and the positive plate on the upper surface of a stacking table.

That is, as illustrated in FIGS. 1(a) and 1(b), the negative plate, the separator, the positive plate, and the separator are sequentially and repeatedly stacked on the stacking table, and a separator dancer member 150 which reciprocates the separator horizontally is installed on the upper side the stacking table, and as illustrated in FIG. 1(c), the negative plate, the separator, the positive plate, and the separator are sequentially stacked.

Figure 2:
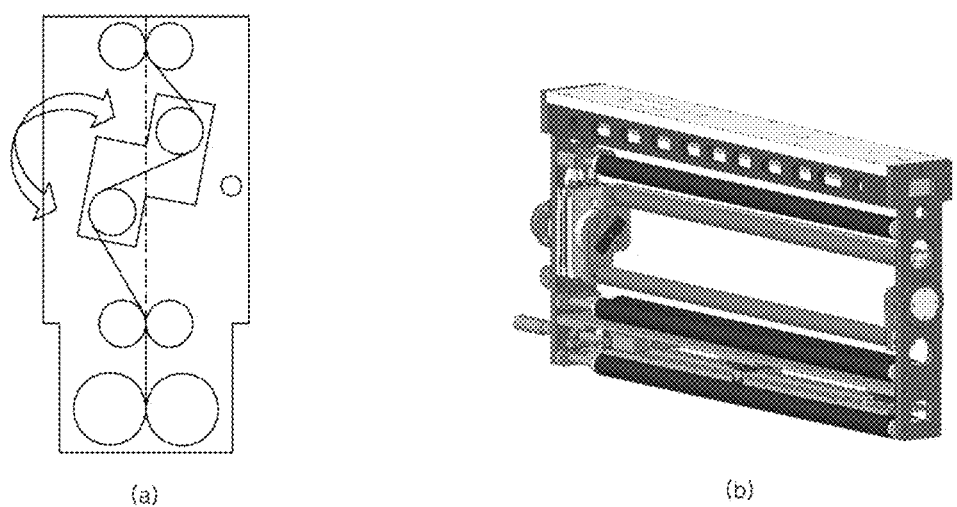
FIG. 2 is a view illustrating a dancer installed on a separator stacking device of a secondary battery.

FIGS. 2(a) and 2(b) illustrate the separator dancer member 150, wherein FIG. 2(a) roughly illustrates the separator dancer member 150, and FIG. 2(b) illustrates the separator dancer member 150 three-dimensionally.

Figure 3:
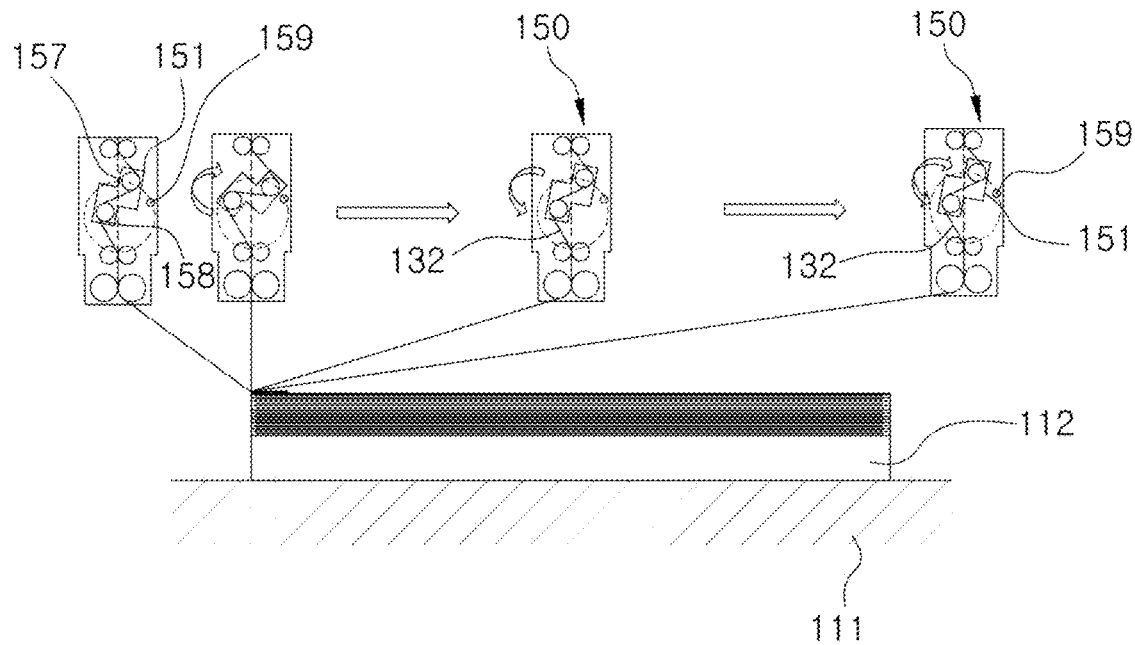
FIG. 3 is a view illustrating the folded state of the separator of the separator stacking device of the secondary battery.
Figure 3:
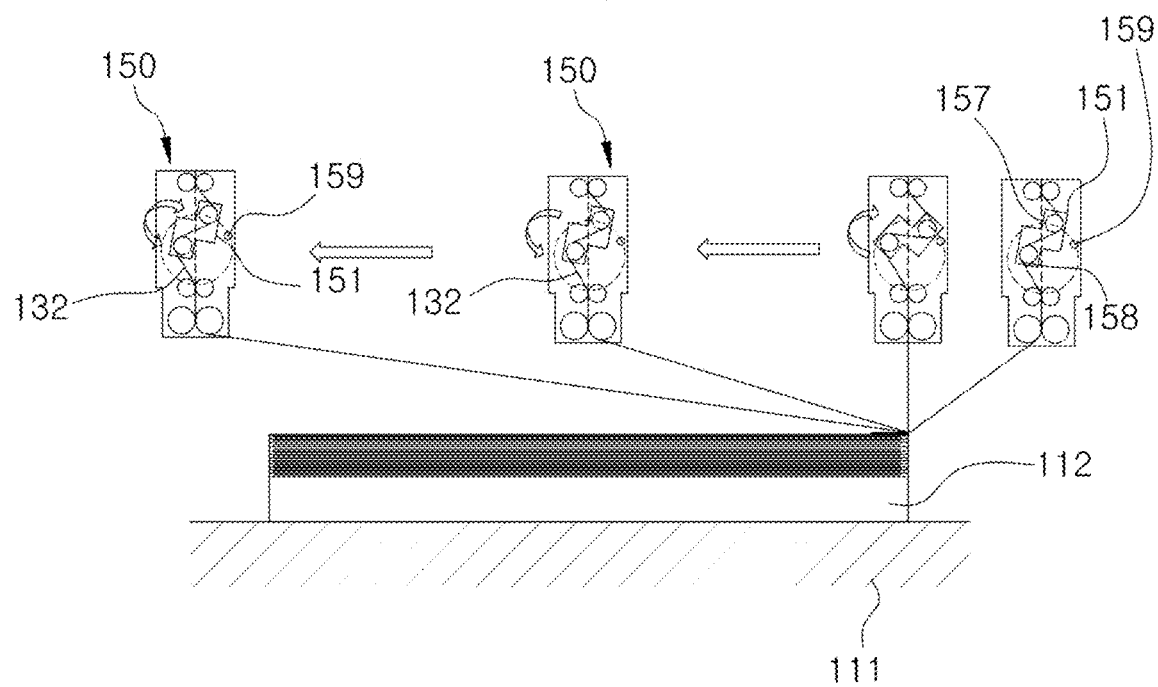

FIGS. 3(a) and 3(b) illustrate the negative plate, the positive plate, and the separator stacked on the stacking table, and the separator dancer member 150 installed at the upper side of the stacking table continuously supplies the separator while reciprocating between the opposite ends of the stacking table.

The operation of the separator dancer member 150 will be described with reference to FIGS. 3(a) and 3(b).

A dancer unit 151 is required to be light enough and to respond rapidly enough to the change of tension applied to the separator 132, but the drawings are intended to explain side effects occurring when the dancer unit 151 does not move by responding rapidly enough to adapt to a rapidly increasing working speed.

In order to rapidly respond to the change of tension applied to the separator 132, there are a method of lightening a separator stacking unit 112 which is required to be rapidly transferred side to side to rapidly stack secondary batteries, a method of lightening the dancer unit 151, and a method of making the dancer unit 151 respond rapidly to the change of tension of the separator 132. As the embodiment of the present disclosure, there is proposed a method of making the dancer unit 151 respond rapidly to the change of tension by using spring, and further, the dancer unit 151 is made of carbon fiber to have a lighter mass such that the dancer unit 151 can move rapidly.

As another embodiment, it is possible to use a cylinder containing compressed gas, a compression spring, and an elastic band, etc. such that the dancer unit 151 responds rapidly to the change of tension applied to the separator.

FIGS. 3(a) and 3(b) illustrate the shapes of the dancer unit 151, the separator dancer member 150, the mandrel 180, and the separator stacking unit 112 when the dancer unit 151 does not rapidly respond to the change of tension applied to the separator 132.

In FIG. 3(a), the dancer unit 151 performs a work thereof while moving from the leftmost side to the right side, and four separator dancer members 150 are illustrated at four different positions and, for convenience, are referred to as ① separator dancer member 150, ② separator dancer member 150, ③ separator dancer member 150, and ④ separator dancer member 150.

In FIG. 3(b), the dancer unit 151 completes one cycle of work while moving from the rightmost side to the left side, and four separator dancer members 150 are illustrated at four different positions and, for convenience, are referred to as ⑤ separator dancer member 150, ⑥ separator dancer member 150, ⑦ separator dancer member 150, and ⑧ separator dancer member 150 from the rightmost side.

The separator of the separator dancer member 150 moved to the leftmost side of the stacking table starts at ① position of the separator stacking unit 112.

In this case, appropriate tension is preset in a spiral spring 165 by rotating a spring casing 164 with preset tension by a control knob 174, and thus appropriate tension is preset in the dancer unit 151 by a spring fixing shaft 168 connected with the dancer unit 151.

When stacking work starts and the separator dance member 150 is moved from ① position of the separator stacking unit 112 to ② position thereof, the length of the separator 132 present between the mandrel 180 and a lower guide roller 155 is more decreased at ② position than at ① position, and the dancer unit 151 is rotated clockwise at ② position, but the reaction speed of the dancer unit 151 does not correspond to the proceeding speed of the dancer unit 151, and thus tension is not applied to the excess of the separator 132, and the separator is seen to be loose and the separator is seen to have released tension.

When the separator dancer member 150 moves to ② position while moving from ① position to the right side, a portion of the separator is loose such that the tension of the separator is released, and when the separator dancer member 150 move to ③ position, a separator is required to be supplied, which causes the dancer unit 151 to maintain appropriate tension of the separator again, and the separator dancer member 150 moves ④ position and a half cycle of the stacking of the separator is completed, and the separator 132 is pressed and fixed by the mandrel 180, and next, the separator dancer member 150 moves to ⑤, ⑥, ⑦, and ⑧ positions of FIG. 3(b), and thus one cycle of the stacking is completed. Even when the separator dancer member 150 moves from the rightest to the left and reaches at position, the same phenomenon as a phenomenon occurring when the ⑥ separator dancer member 150 is located at ② position occurs, thereby causing defects of a product due to tension difference.

That is, the separator dancer member 150 moves in the period of 0.2 to 0.3 seconds, and customers are increasingly demanding faster speed of the separator dancer member 150, and accordingly, the quality of a secondary battery decreases due to a phenomenon (hereinafter, referred to as the back phenomenon) in which the tension of the separator is released by loose folding of a portion of the separator supplied by passing through the separator dancer member 150. To solve this problem, there is an increasing need to prevent the back phenomenon while the separator dancer member 150 responds at an increasing speed.

The back phenomenon occurs since a portion of the separator is loosely folded. The stacking work is required to be performed while constant tension is applied to the separator placed between the negative plate and the positive plate, but when tension applied to the separator is changed, the stacked separator of a secondary battery is slanted or wrinkled due to the change of the tension, and thus the defect of the secondary battery may occur. Accordingly, in order to remove the back phenomenon in which tension is released, the separator tension control device of the present disclosure is provided with the separator dancer member 150 that can continuously apply similar tension to the separator during the stacking of the separator.

According to the exemplary embodiment of the present disclosure, the separator tension control device for stacking a separator of a secondary battery includes: a separator stacking member 110 having: the separator stacking unit 112 installed on an upper surface of the table 111 such that negative and positive plates of a secondary battery are alternately stacked by the separator 132; and the fixing plate 114 which allows a separator supply member 130 and the separator dancer member 150 to be installed thereon; the separator supply member 130 installed on one side of the separator stacking unit 112 so as to supply the separator 132 to the separator stacking unit 112; and the separator dancer member 150 installed on the upper side of the separator stacking member 110 such that the separator 132 supplied from the separator supply member 130 is supplied with constant tension.

Figure 4:
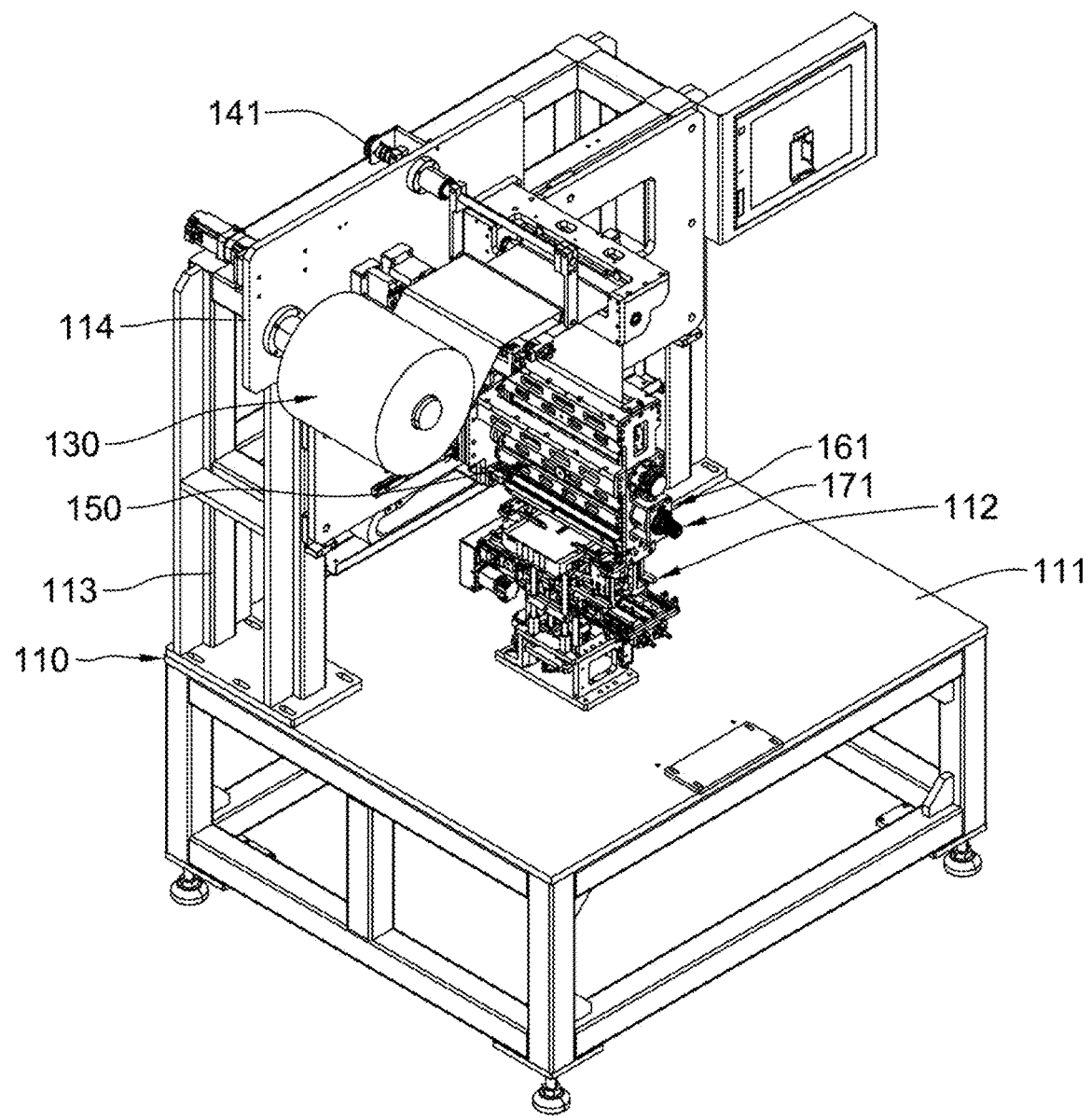
FIG. 4 is a perspective view illustrating a separator tension control device for stacking a separator of a secondary battery according to an exemplary embodiment of the present disclosure.
Figure 5:
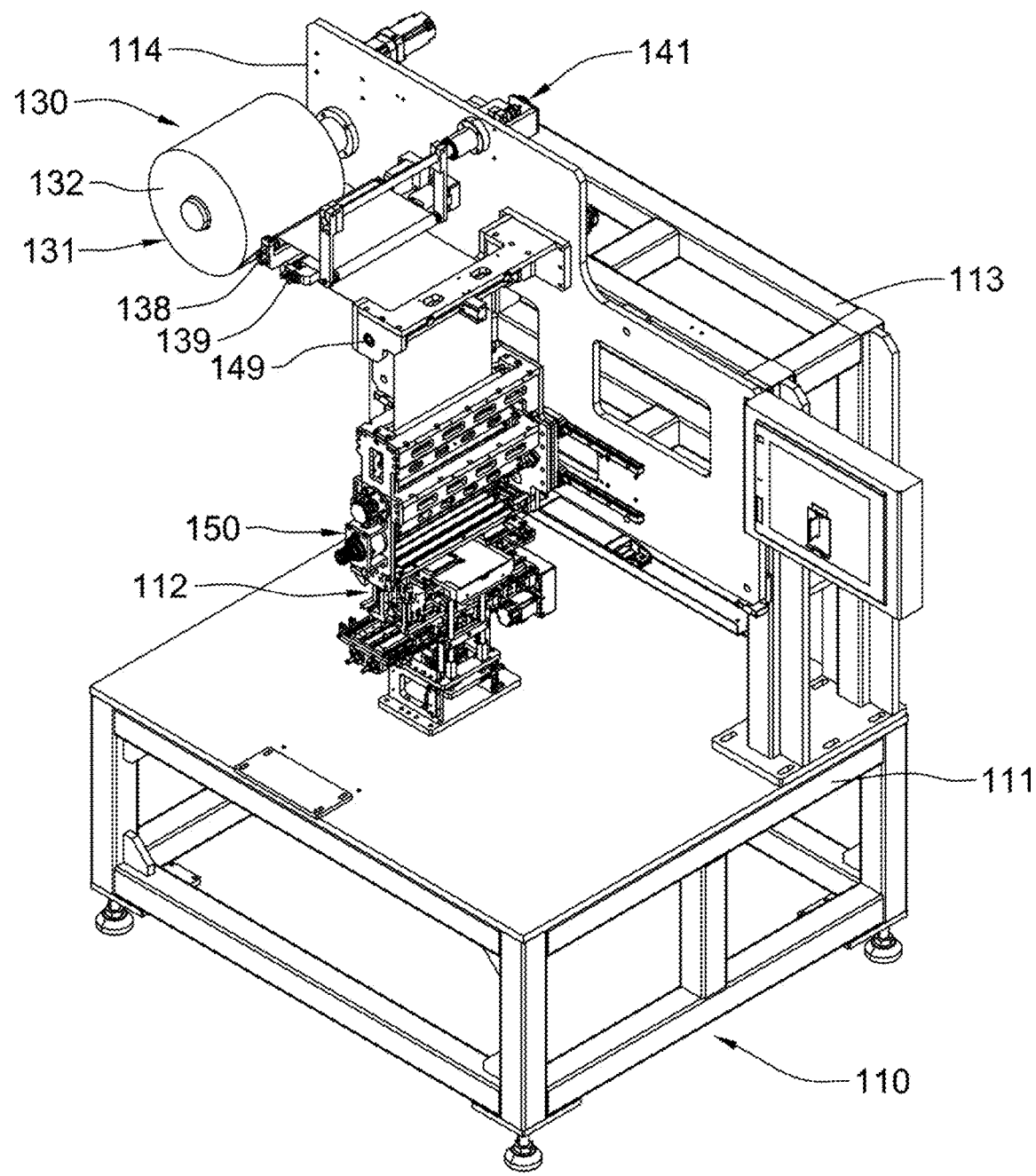
FIG. 5 is a perspective view illustrating the separator tension control device for stacking a separator of a secondary battery according to the exemplary embodiment of the present disclosure.
Figure 6:
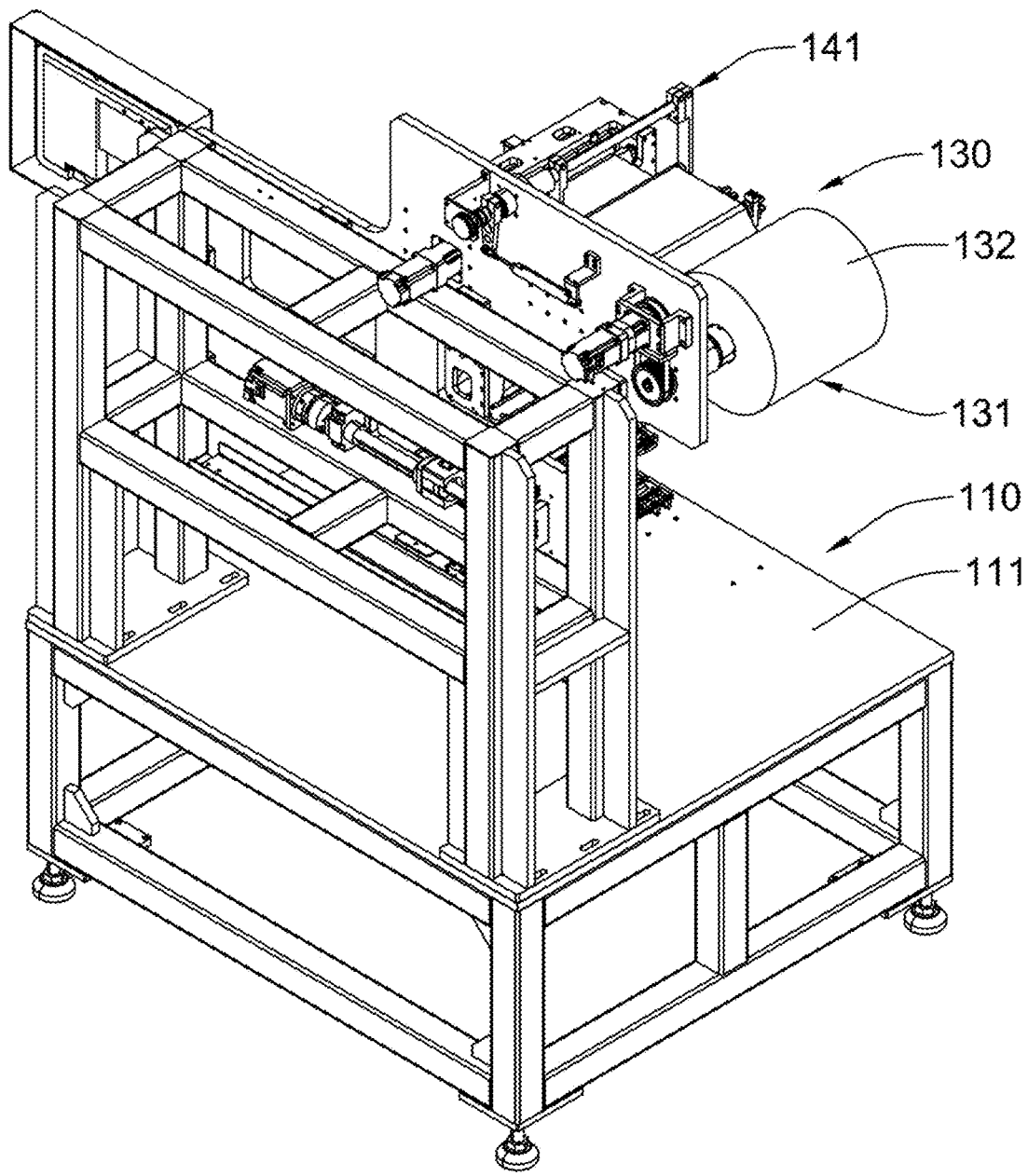
FIG. 6 is a perspective view illustrating the separator tension control device for stacking a separator of a secondary battery according to the exemplary embodiment of the present disclosure.
Figure 7:
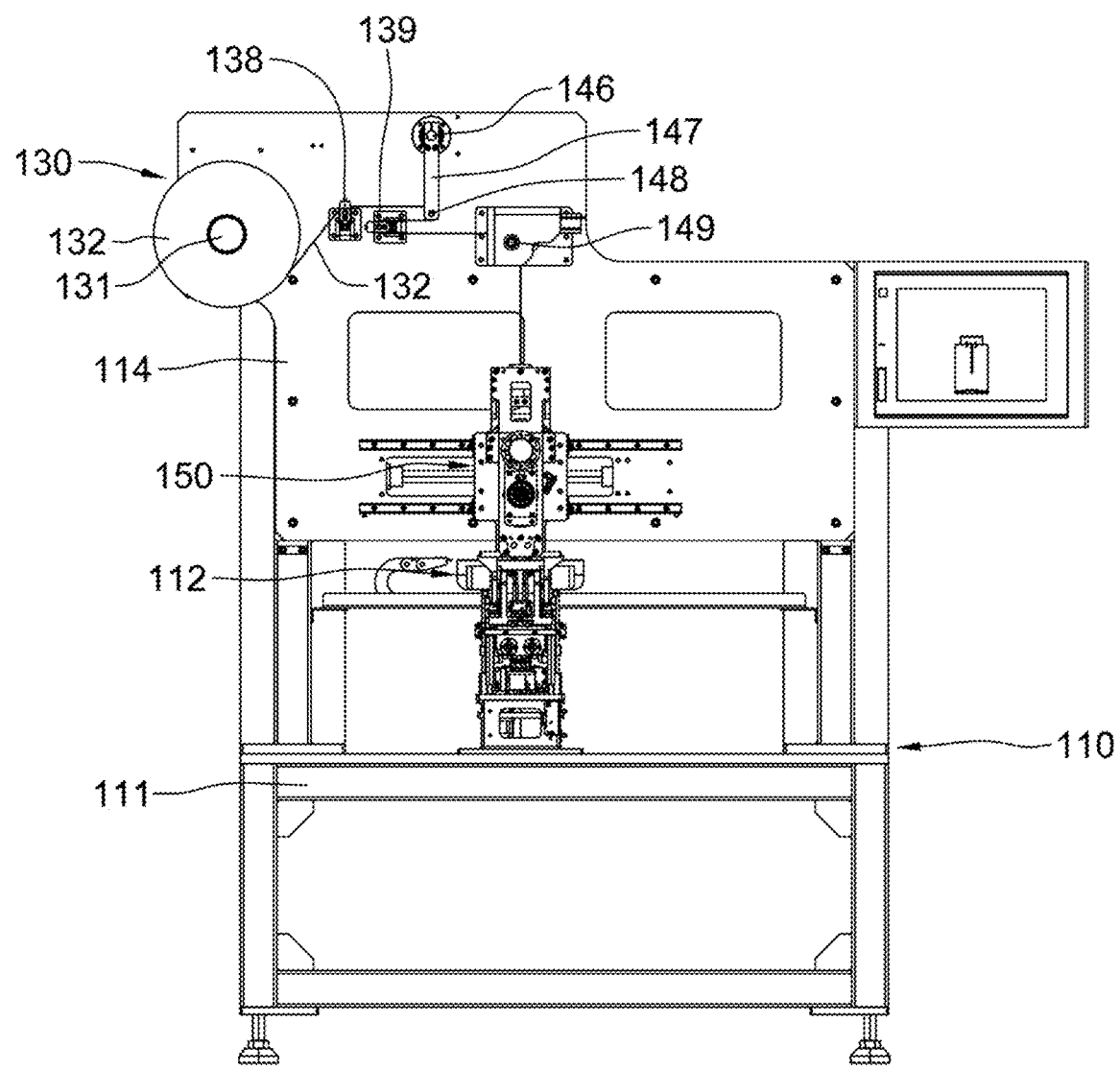
FIG. 7 is a front view illustrating the separator tension control device for stacking a separator of a secondary battery according to the exemplary embodiment of the present disclosure.

FIG. 4 is a perspective view illustrating the separator tension control device for stacking a separator of a secondary battery according to the exemplary embodiment of the present disclosure; FIG. 5 is a perspective view illustrating the separator tension control device for stacking a separator of a secondary battery according to the exemplary embodiment of the present disclosure; FIG. 6 is a perspective view illustrating the separator tension control device for stacking a separator of a secondary battery according to the exemplary embodiment of the present disclosure; and FIG. 7 is a front view illustrating the separator tension control device for stacking a separator of a secondary battery according to the exemplary embodiment of the present disclosure.

As illustrated in FIGS. 4 to 7, the table 111 is installed in the separator stacking member 110 of the separator tension control device according to the embodiment of the present disclosure, and the separator stacking unit 112 is installed on the upper surface of the table 111 such that the negative plate, the separator 132, the positive plate, and the separator 132 can be sequentially and continuously stacked.

FIGS. 1(a), 1(b), and 1(c), the separator stacking unit 112 stacks the negative plate, the separator 132, the positive plate, and the separator 132 sequentially and continuously, and the detailed description of the separator stacking unit 112 will be omitted.

A fixed frame 113 is installed on one side of the upper surface of the table 111, and the fixed plate 114 is installed on the fixed frame 113 so as to install the separator supply member 130.

Figure 8:
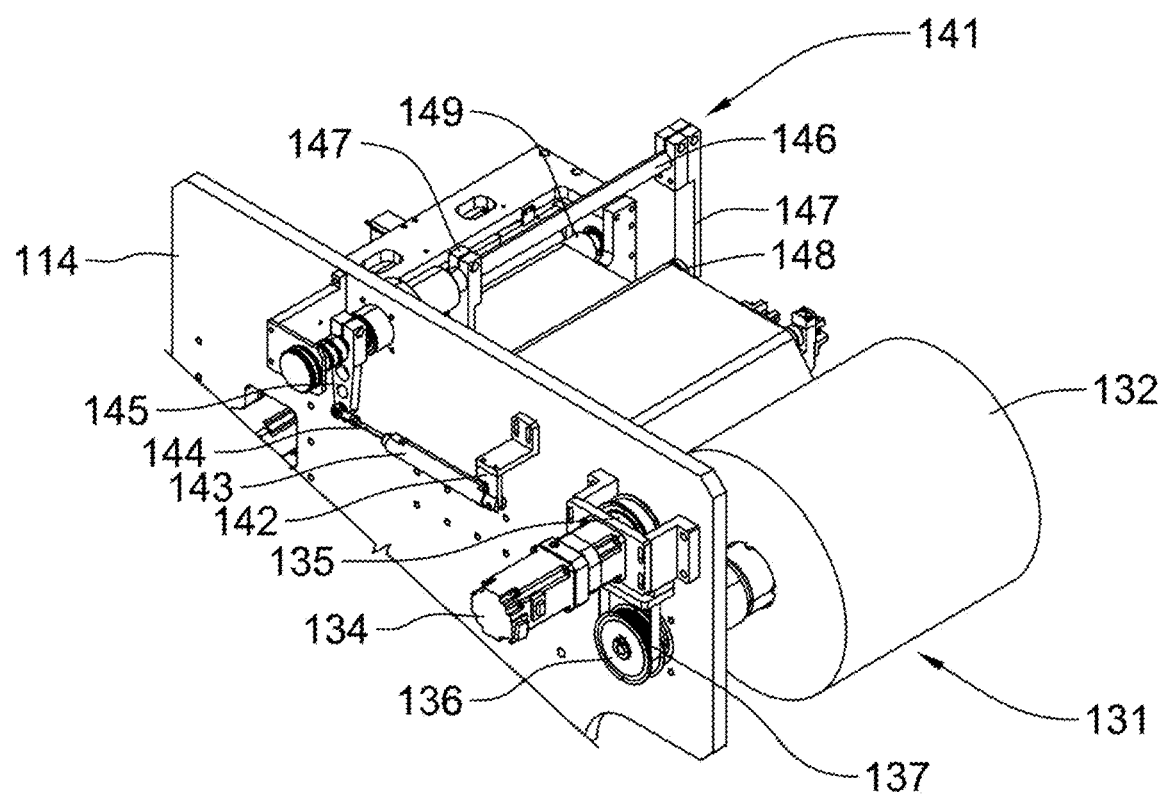
FIG. 8 is a partially enlarged perspective view illustrating a separator supply member of the separator tension control device for stacking a separator of a secondary battery according to the exemplary embodiment of the present disclosure.
Figure 9:
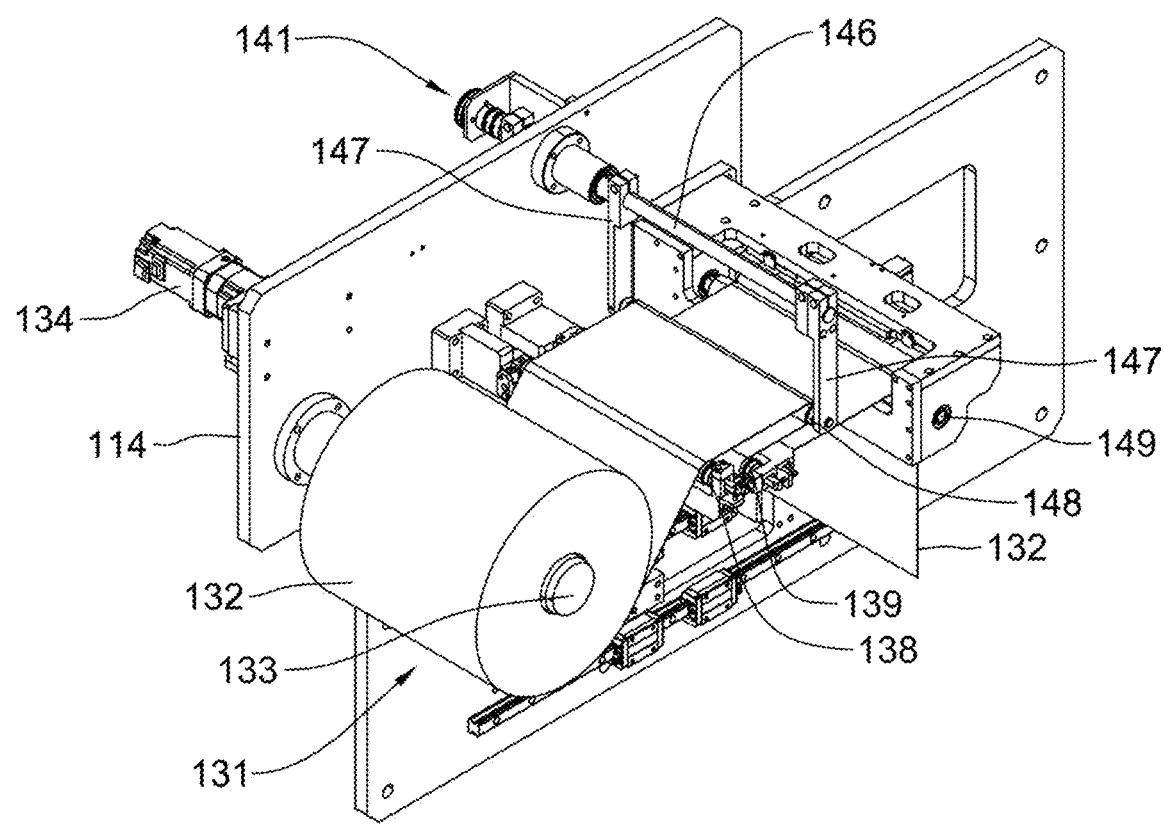
FIG. 9 is a perspective view illustrating the separator supply member of the separator tension control device for stacking a separator of a secondary battery according to the exemplary embodiment of the present disclosure.

FIG. 8 is a partially enlarged perspective view illustrating the separator supply member of the separator tension control device for stacking a separator of a secondary battery according to the exemplary embodiment of the present disclosure, and FIG. 9 is a perspective view illustrating the separator supply member of the separator tension control device for stacking a separator of a secondary battery according to the exemplary embodiment of the present disclosure.

As shown in FIGS. 7 to 9, the separator supply member 130 is installed on the fixed plate 114, and a separator supply unit 131 which supplies the separator 132 and a tension control unit 141 which allows the separator 132 to be moved and supplied elastically are installed on the separator supply member 130.

The separator supply member 130 includes: the separator supply unit 131 which unwinds the separator 132 wound in a shape of a roll; and the tension control unit 141 installed on one side of the separator supply unit 131 so as to control tension of the separator 132 supplied to the separator dancer member 150.

The separator supply unit 131 continuously supplies the separator 132, and the tension control unit 141 controls the tension of the separator 132 such that the separator 132 supplied to the separator dancer member 150 can be maintained to be tight.

The separator supply unit 131 includes: the separator 132 wound in the shape of a roll; an air shaft 133 installed rotatably on the fixed plate 114 such that the separator 132 is attached to and detached from the air shaft 133; a drive motor 134 installed on one side of the air shaft 133 so as to rotate the air shaft 133 at a constant speed; a driving pulley 135 which transmits rotational force of the drive motor 134; a driven pulley 136 which receives rotational force of the driving pulley 135; and a first guide roller 138 and a second guide roller 139 installed by being spaced apart by a predetermined distance from the air shaft 133 so as to guide movement of the separator 132 unwound from the roll of the separator 132.

The separator 132 wound in the form of a roll is installed on the separator supply unit 131, and the air shaft 133 is installed on the fixed plate 114 such that the separator 132 can be mounted on the air shaft 133.

The drive motor 134 is installed on the fixed plate 114 so as to rotate the air shaft 133 at a constant speed, and the driving pulley 135 is installed on the drive motor 134 so as to transmit the rotational force of the air shaft, and the driven pulley 136 is rotatably installed under the driving pulley 135.

A belt 137 which transmits the rotational force is located between and installed on the driving pulley 135 and the driven pulley 136, and the air shaft 133 is rotated at a constant speed by the driven pulley 136.

Accordingly, the separator 132 having the form of a roll installed on the air shaft 133 is unwound at a constant speed.

Furthermore, the first guide roller 138 and the second guide roller 139 on one side of the air shaft 133 are installed to be spaced apart by a predetermined distance from each other such that the separator 132 can be moved in a taut state.

Accordingly, the separator 132 which is unwound from the air shaft 133 passes through the first guide roller 138, the tension control unit 141, and the second guide roller 139, and is supplied in a taut state.

Meanwhile, the tension control unit 141 is intended to control the tension of the separator 132 and changes the position of a rotating roller 148 of the tension control unit 141 such that the tension of the separator 132 can be controlled.

The tension control unit 141 includes: a fixing bracket 142 installed on the fixed plate 114; the cylinder 143 installed rotatably on the fixing bracket 142; a piston 144 installed in the cylinder 143 such that the piston 144 moves into and out of the cylinder 143; a rotating rod 145 installed to be rotated by the inward and outward movement of the piston 144; a rotating shaft 146 installed on the fixed plate 114 such that the rotating shaft 146 is rotated by the rotating rod 145; a pair of rotating brackets 147 installed on the rotating shaft 146; and the rotating roller 148 installed rotatably on the pair of rotating brackets 147.

The fixing bracket 142 is installed on one surface of the fixed plate 114 such that the cylinder 143 can be installed, and the cylinder 143 is installed rotatably on the fixing bracket 142.

The piston 144 whose length changes is coupled to the cylinder 143, and the rotating rod 145 is coupled to the piston 144 and is rotated by the protruding of the piston 144.

The rotating shaft 146 is installed on the rotating rod 145, and the pair of rotating brackets 147 is respectively installed on the opposite sides of the rotating shaft 146.

The rotating roller 148 is located between and rotatably installed on the pair of rotating brackets 147, and the separator 132 sequentially passes through the first guide roller 138, the rotating roller 148, and the second guide roller 139.

That is, the piston 144 rotates the rotating rod 145, and the rotating rod 145 rotates the rotating shaft 146, so the position of the rotating roller 148 is changed.

As illustrated in FIG. 7, when the rotating roller 148 moves to the right side in the drawing, the movement length of the separator 132 increases, and accordingly, the separator 132 has increased tension and is even tighter.

Contrarily, when the rotating roller 148 moves to the left side in the drawing, the movement length of the separator 132 decreases, and accordingly, the separator 132 has decreased tension and maintains a relatively loose tension state.

The tension control unit 141 has a third guide roller 149 installed at one side thereof, and the third guide roller 149 allows the separator 132 to be supplied from the upper side of the separator dancer member 150.

Figure 10:
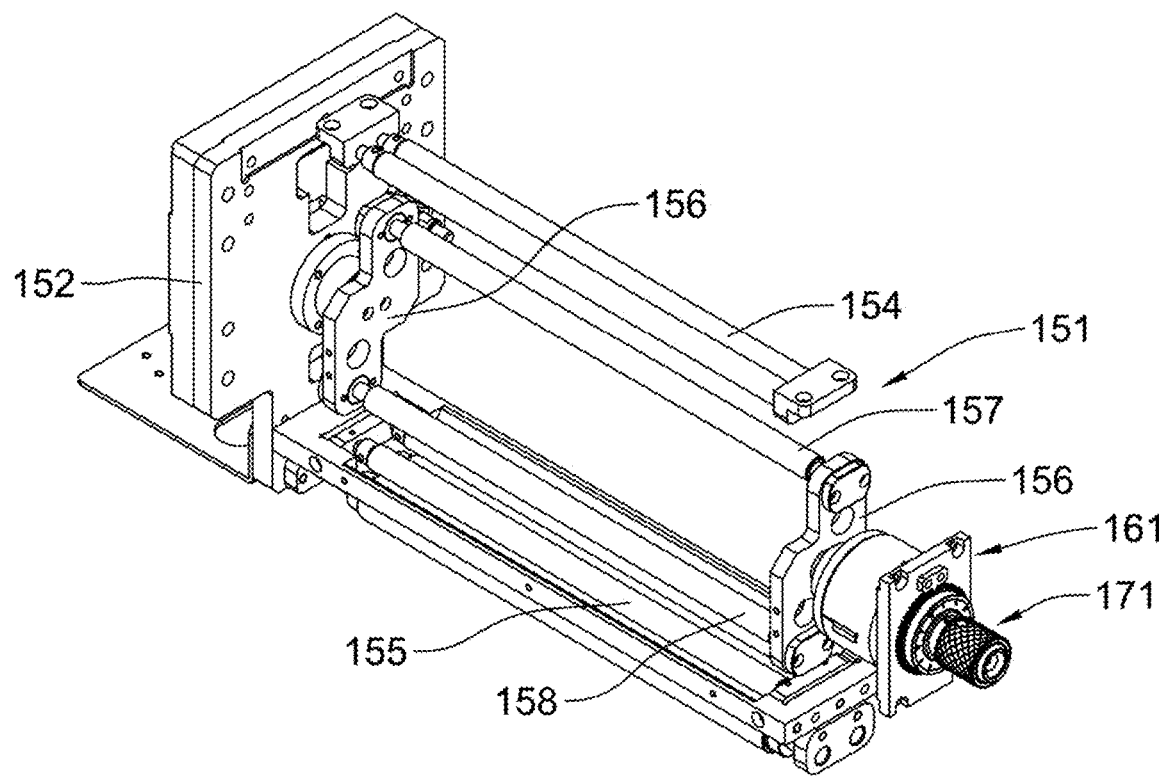
FIG. 10 is a perspective view illustrating a separator dancer member of the separator tension control device for stacking a separator of a secondary battery according to the exemplary embodiment of the present disclosure.
Figure 11:
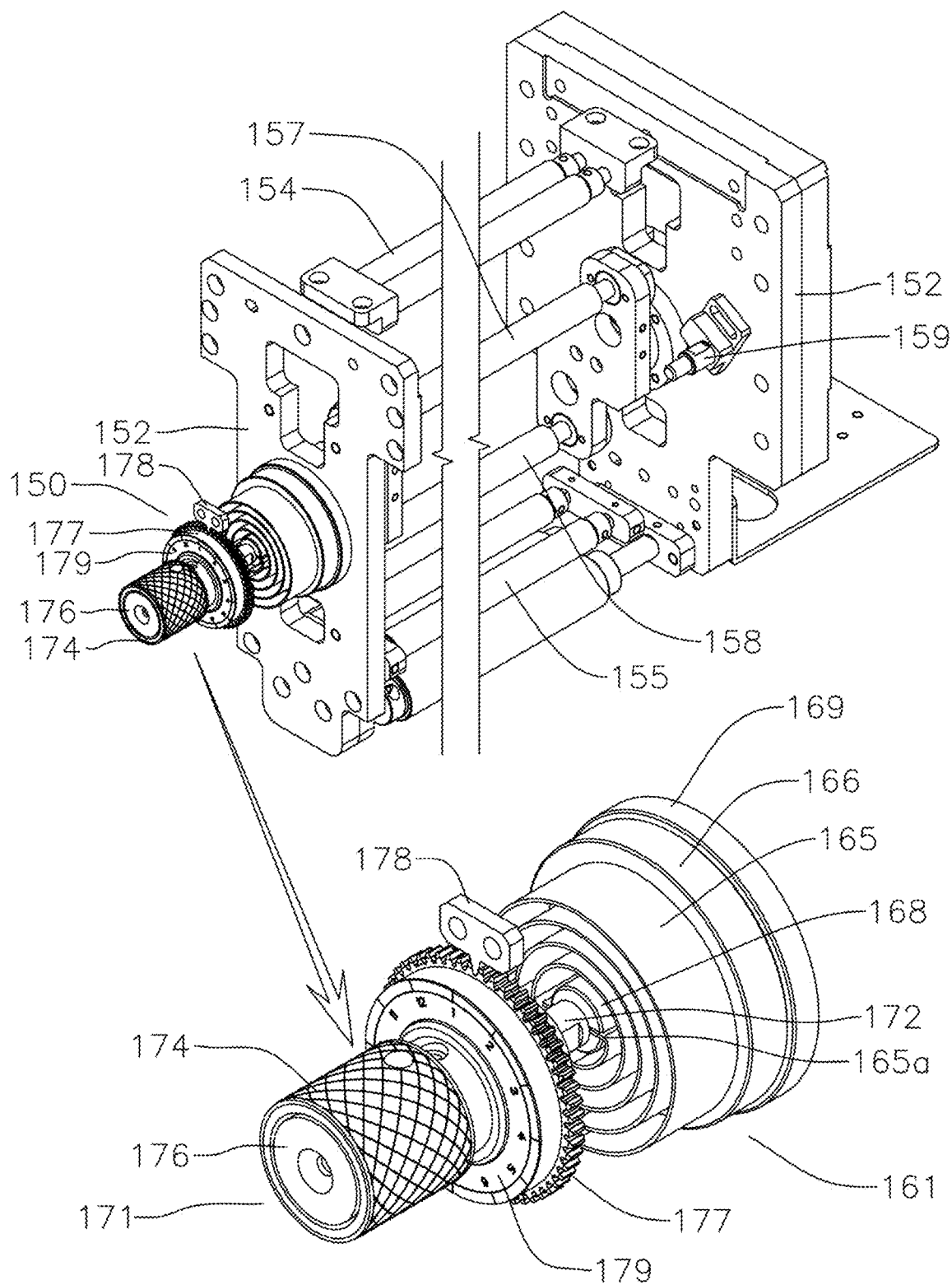
FIG. 11 is a partially enlarged perspective view illustrating the separator dancer member of the separator tension control device for stacking a separator of a secondary battery according to the exemplary embodiment of the present disclosure.
Figure 12:
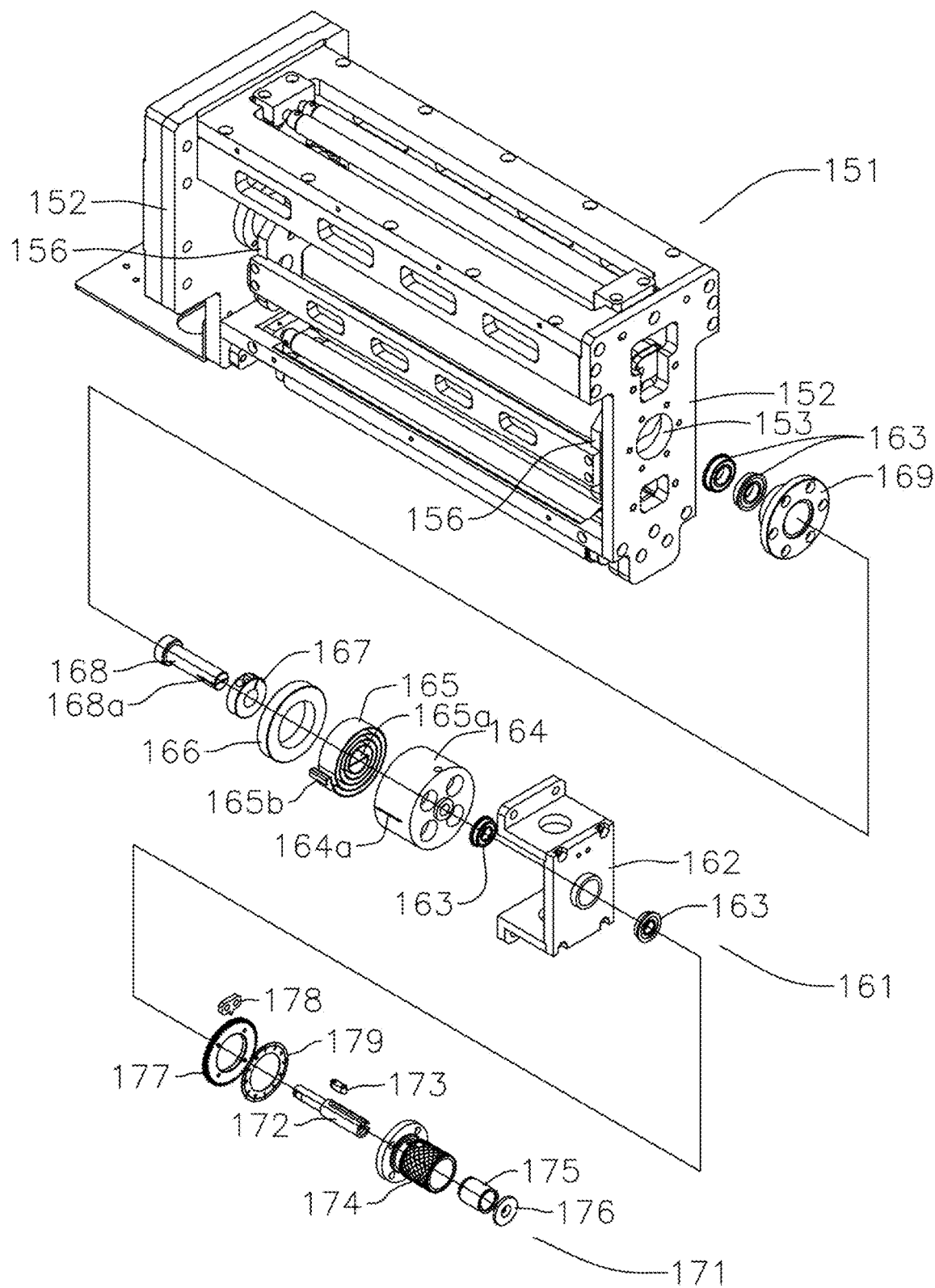
FIG. 12 is an exploded perspective view illustrating the separator dancer member of the separator tension control device for stacking a separator of a secondary battery according to the exemplary embodiment of the present disclosure.
Figure 13:
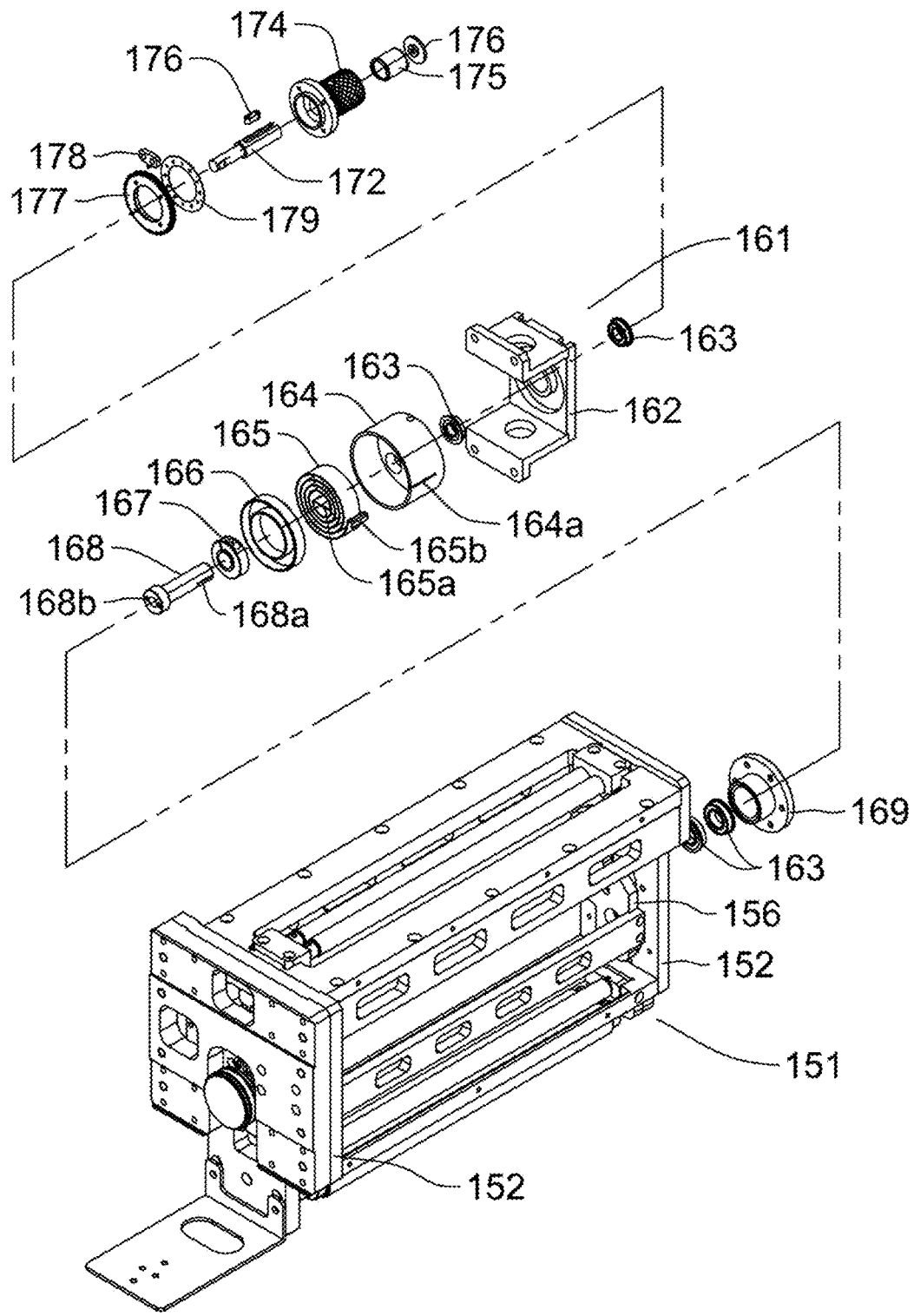
FIG. 13 is an exploded perspective view illustrating the separator dancer member of the separator tension control device for stacking a separator of a secondary battery according to the exemplary embodiment of the present disclosure.
Figure 14:
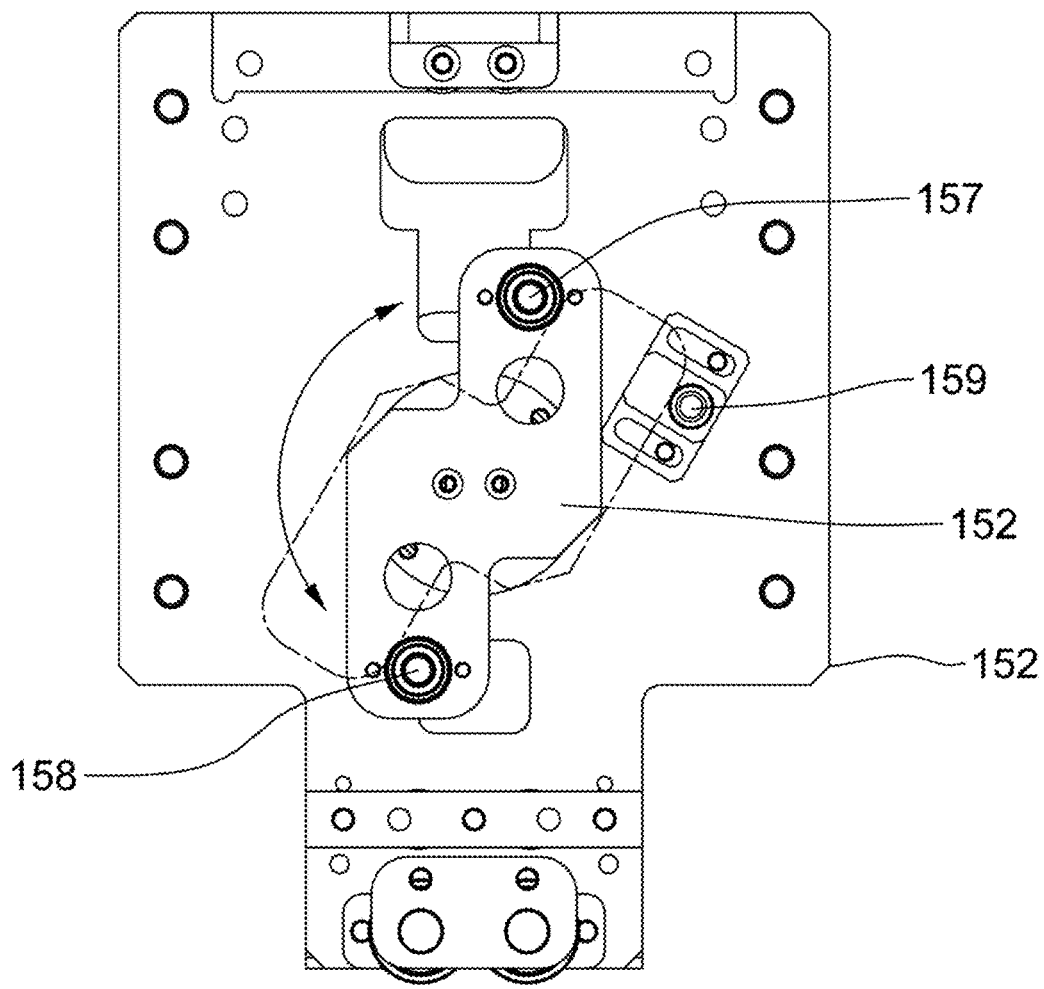
FIG. 14 is a front view illustrating the rotated state of the separator dancer member of the separator tension control device for stacking a separator of a secondary battery according to the exemplary embodiment of the present disclosure.

FIG. 10 is a perspective view illustrating the separator dancer member of the separator tension control device for stacking a separator of a secondary battery according to the exemplary embodiment of the present disclosure; FIG. 11 is a partially enlarged perspective view illustrating the separator dancer member of the separator tension control device for stacking a separator of a secondary battery according to the exemplary embodiment of the present disclosure; FIG. 12 is an exploded perspective view illustrating the separator dancer member of the separator tension control device for stacking a separator of a secondary battery according to the exemplary embodiment of the present disclosure; and FIG. 13 is an exploded perspective view illustrating the separator dancer member of the separator tension control device for stacking a separator of a secondary battery according to the exemplary embodiment of the present disclosure.

As shown in FIGS. 10 to 13, the separator dancer member 150 includes: the dancer unit 151 installed on the fixed plate 114 such that the dancer unit 151 is rotated by a predetermined limited angle such that the separator 132 moved from the separator supply member 130 maintains constant tension; the tension elastic unit 161 installed on one side of the dancer unit 151 such that the dancer unit 151 is rotated clockwise and counterclockwise by the predetermined limited angle by elasticity of the tension elastic unit 161 such that the tension of the separator 132 is maintained; and a dancer tension control unit 171 installed on one side of the tension elastic unit 161 such that elasticity of the tension elastic unit 161 is controlled.

The separator dancer member 150 prevents the phenomenon (hereinafter, referred to as the back phenomenon) in which the tension of the separator is released due to the loose folding of a portion of the separator 132; the dancer unit 151 guides the separator 132 to the separator stacking unit 112; the tension elastic unit 161 maintains the tension of the separator 132; and the dancer tension control unit 171 controls the elasticity of the tension elastic unit 161.

In the separator dancer member 150, the dancer unit 151 is efficiently rotated by the separator 132 such that the rapid restoration of the dancer unit 151 is performed and may be made of a lightweight carbon fiber material such that the dancer unit 151 can be rapidly operated by the compression force and restoring force of the spiral spring 165.

Furthermore, in order to increase a work speed, it is advantageous that the separator dancer member 150 has light weight to rapidly reciprocate, and thus the separator dancer member 150 may be made of carbon fiber or a lighter material to make the separator dancer member 150 lighter.

That is, the separator dancer member 150 includes the dancer unit 151, the tension elastic unit 161, and the dancer tension control unit 171. First, the dancer unit 151 is made of a lightweight carbon fiber material such that the dancer unit 151 can be efficiently rotated by the separator 132 and such that the clockwise/counterclockwise rotation of the dancer unit 151 can be rapidly performed by the compression force and restoring force of the spiral spring 165, and further, the separator dancer member 150 is also made of a lightweight carbon fiber material for efficient and rapid reciprocation.

Accordingly, as the separator dancer member 150 is made of a lightweight carbon material, rotation of the dancer unit 151 and restoration of the dancer unit 151 to an initial position thereof are made rapidly, so the dancer unit 151 can supply the separator 132 without the phenomenon (hereinafter, referred to as the back phenomenon) in which the tension of the separator 132 whose portion is loosened is released.

The dancer unit 151 includes: a pair of dancer fixing plates 152 installed to be spaced apart by a predetermined distance from each other; an upper guide roller 154 installed on upper parts of the pair of dancer fixing plates 152 such that the separator 132 is pulled horizontally by a predetermined distance by the rotation of the dancer unit 151; the lower guide roller 155 installed on lower parts of the pair of dancer fixing plates 152 such that the separator 132 is pulled horizontally by a predetermined distance by the rotation of the dancer unit 151; and a dancer stopper 159 installed on the dancer fixing plate 152 such that the dancer unit 151 is rotated at the predetermined limited angle.

The dancer fixing plates 152 of the dancer unit 151 are installed to be spaced apart by a predetermined distance from each other, and a coupling hole 153 is formed in each of the dancer fixing plates 152 such that the tension elastic unit 161 is installed on the dancer fixing plate 152 by passing therethrough.

The upper guide roller 154 which guides the movement of the separator 132 is installed on the upper part of the dancer fixing plates 152, and the lower guide roller 155 which guides the movement of the separator 132 is installed on the lower part of the dancer fixing plates 152.

Furthermore, a dancer fixing bracket 156 rotated by the tension elastic unit 161 is rotatably installed on the inner surfaces of the pair of dancer fixing plates 152.

An upper roller 157 with which the separator 132 is in contact is installed on the upper part of the dancer fixing bracket 156, and a lower roller 158 with which the separator 132 is in contact is installed on the lower part of the dancer fixing bracket 156.

The dancer stopper 159 is installed on the dancer fixing bracket 156 by being spaced apart by a predetermined distance from the upper roller 157 and limits the excessive rotation of the dancer unit 151.

The dancer stopper 159 limits the rotation of the upper roller 157 rotated by the dancer fixing bracket 156, and prevents defect of a product caused by changing the position of the separator 132 from the position of the upper roller 157 in contact with the separator 132 due to the impact of the excessive collision of the dancer stopper 159 with the upper roller 157 due to the rotation of the upper roller 157 at the angle of about 20~50° or more. That is, this means the change of tension applied the separator 132 is great, and the upper roller 157 is preferably limited to rotate at the angle of 30~40° such that the upper roller 157 does not collide with the dancer stopper 159.

Accordingly, the dancer stopper 159 limits the rotation angle of the upper roller 157 such that the separator 132 is not strained more than necessary.

The tension elastic unit 161 includes: an outer fixing bracket 162 installed on the dancer fixing plate 152 of the dancer unit 151; the spring casing 164 which is rotatably installed inside the outer fixing bracket 162 and has a spring fixing groove part 164a such that a spring fixing end 165b of the spiral spring 165 is coupled to the spring fixing groove part 164a; the spiral spring 165 installed inside the spring casing 164 so as to rotate the dancer unit 151 by a limited angle; and the spring fixing shaft 168 having a spring fixing groove part 168a such that a spring free end 165a formed on an end of the spiral spring 165 is coupled to the spring fixing groove part 168a, the spring fixing shaft 168 being installed through the spiral spring 165 such that the spring fixing shaft 168 is rotated by the dancer tension control unit 171.

The outer fixing bracket 162 is installed on one surface of the dancer fixing plate 152, and a pair of bearings 163 is installed on the outer fixing bracket 162 such that the dancer fixing shaft 172 of the dancer tension control unit 171 can be efficiently rotated.

The spring casing 164 is rotatably installed inside the outer fixing bracket 162, and the spring fixing groove part 164a is formed in the spring casing 164 such that the spring fixing end 165b of the spiral spring 165 can be coupled to the spring fixing groove part 164a.

That is, the spring fixing end 165b is fitted into the spring fixing groove part 164a, and the spring casing 164 rotates freely by the elasticity of the spiral spring 165.

The spiral spring 165 which rotates the dancer fixing bracket 156 is installed inside the spring casing 164. The spiral spring 165 is configured as a kind of winding spring.

The spring free end 165a is formed on the inner end of the spiral spring 165 such that the spring free end 165a can be coupled to the spring fixing shaft 168, and the spring fixing end 165b is formed on the outer end of the spiral spring 165 such that the spring fixing end 165b can be coupled to the spring fixing groove part 164a.

A fixed hub casing 166 is installed on one surface of the spiral spring 165, and a first fixed hub 167 is installed on the inner side of the fixed hub casing 166, and the spring fixing shaft 168 having a predetermined length is installed on the first fixed hub 167.

Furthermore, the spring fixing groove part 168a is formed in the spring fixing shaft 168 such that the spring free end 165a is coupled to the spring fixing shaft 168. The spring free end 165a is coupled to the spring fixing groove part 168a.

In addition, a bolt hole 168b is formed in the spring fixing shaft 168 such that the spring fixing shaft 168 is coupled to the dancer fixing bracket 156. The spring fixing shaft 168 is coupled to the dancer fixing bracket 156 by a pair of bolts.

Furthermore, a second fixed hub 169 is installed on the dancer fixing plate 152, and the spring fixing shaft 168 is coupled to the center of rotation of the dancer fixing bracket 156 through the second fixed hub 169 and the pair of bearings 163.

The spring free end 165a of the spiral spring 165 is coupled to the spring fixing groove part 168a of the spring fixing shaft 168, and the spring fixing end 165b of the spiral spring 165 is coupled to the spring fixing groove part 164a of the spring casing 164.

Accordingly, the spiral spring 165, one side of which is fixed to the spring casing 164, rotates the spring free end 165a clockwise or counterclockwise by elasticity, and accordingly, the spring fixing shaft 168 is rotated and the dancer fixing bracket 156 fixed to the spring fixing shaft 168 by a pair of bolts is rotated.

That is, the dancer unit 151 reciprocates the separator 132, and when the upper roller 157 and the lower roller 158 are rotated clockwise due to the rotation of the dancer unit 151, the dancer fixing bracket 156 moves in a direction of increasing the length of the separator 132 inside the dancer unit 151, and tension applied to the separator 132 is increased, and to compensate for this, the separator 132 is supplied to the inside of the dancer unit 151 from the outside thereof, which decreases the increased tension. When the upper roller 157 and the lower roller 158 are rotated counterclockwise, the dancer fixing bracket 156 moves in a direction of decreasing the length of the separator 132 inside the dancer unit 151, and tension applied to the separator 132 is decreased, and to compensate for this, the separator 132 is supplied to the outside of the dancer unit 151 from the inside thereof, which increases the decreased tension.

Tension occurring when stacking the separator of a secondary battery by the separator dancer member 150 will be described. The dancer unit 151 is provided inside the separator dancer member 150 and operates according to the change of the degree of tension applied to the separator when stacking the separator 132 and function to make tension applied to the separator constant.

When tension applied to the separator 132 located between the mandrel 180 and the lower end of the dancer unit 151 is smaller than appropriate tension (tension preset by the control knob 174), the dancer unit 151 rotates clockwise and pulls a portion of the separator 132. Contrarily, when tension applied to the separator 132 located between the mandrel 180 and the lower end of the dancer unit 151 is greater than appropriate tension (tension preset by the control knob 174), the dancer unit 151 to which the upper roller 157 and the lower roller 158 are mounted rotates counterclockwise, a portion of the separator 132 is supplied to make the change of tension, which may occur during stacking work, constant, thereby ensuring the production of good products.

Accordingly, the spring fixing shaft 168 coupled fixedly to the dancer fixing bracket 156 is coupled to the inner end of the spiral spring 165, and the spring casing 164 coupled to the outer end of the spiral spring 165 is coupled to the control knob 174. Accordingly, the spring casing 164 is rotated as much as intensity of tension controlled by the control knob 174, and tension applied to the spiral spring 165 is increased or decreased, and accordingly, when tension applied to the separator 132 is smaller than preset tension, the spiral spring 165 increases in length and rotates the dancer unit 151 clockwise to pull the separator 132 such that the dancer unit 151 is rotated as much as the preset tension. Contrarily, when tension applied to the separator 132 is greater than preset tension, the spiral spring 165 decreases in length and rotates the dancer unit 151 counterclockwise and releases (supplies) the separator 132 such that the dancer unit 151 is rotated as much as the preset tension, and accordingly, the tension of the separator 132 supplied to a secondary battery is decreased up to preset tension, so the stacked separator of the secondary battery is prevented from tilting or wrinkling in a portion due to tension difference, thereby enabling the production of the good products.

Figure 15:
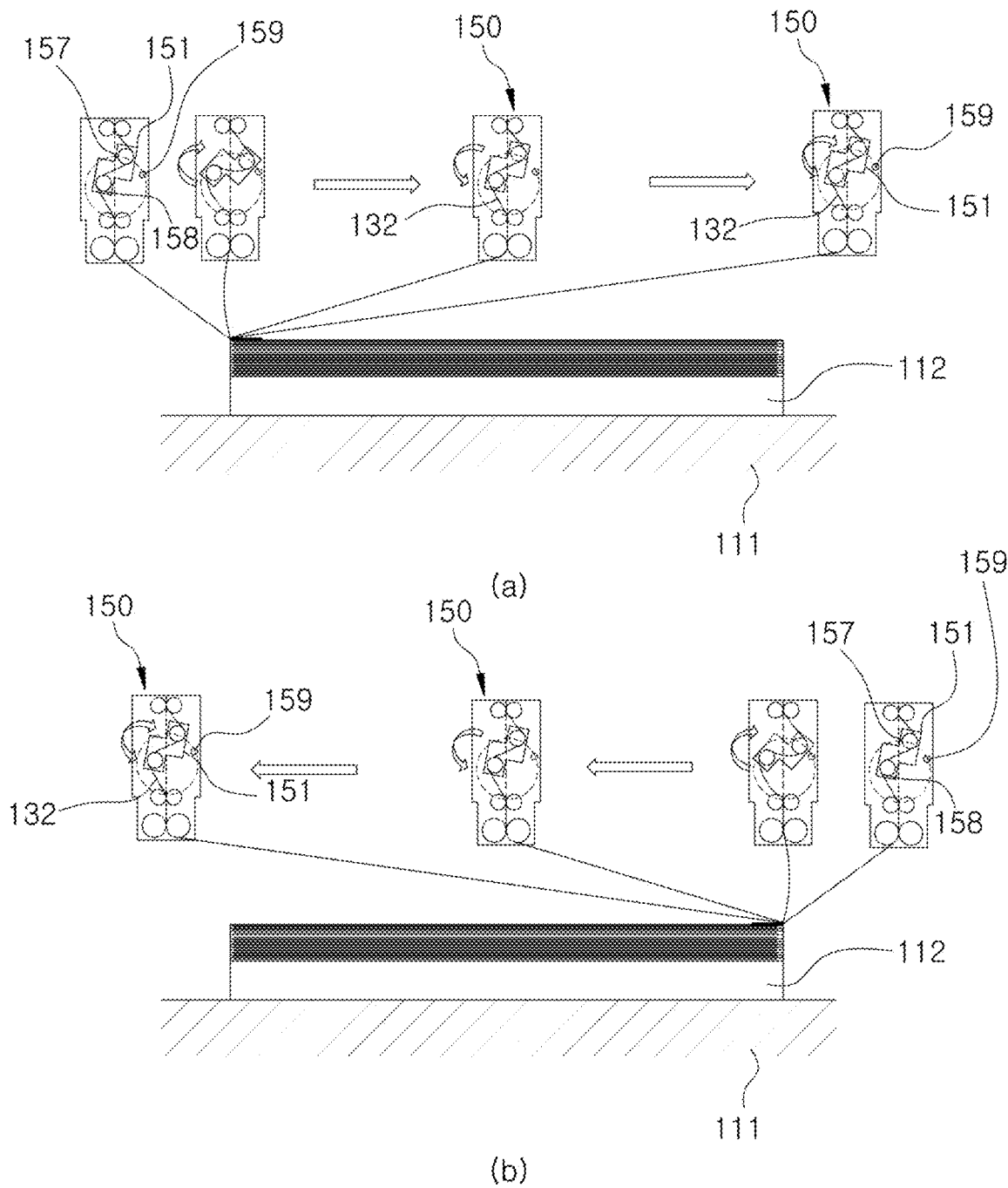
FIG. 15 is a view roughly illustrating a state in which the separator is supplied by the separator tension control device for stacking a separator of a secondary battery according to the exemplary embodiment of the present disclosure.

FIGS. 15(*a*) and 15(*b*) are views roughly illustrating a state in which the separator is supplied by the separator tension control device for stacking a separator of a secondary battery according to the exemplary embodiment of the present disclosure.

As illustrated in FIG. 15(*a*), when the dancer unit 151 moves from the left side to the right side in the drawing, the dancer unit 151 is rotated according to the change of the tension of the separator 132 and accordingly, the rotation direction of the spring fixing shaft 168 is determined. Tension applied to the dancer unit 151 is determined according to the degree of tension preset in the spiral spring 165, and when the preset tension is smaller than the tension of the separator 132, the dancer unit 151 is rotated counterclockwise by the tension of the separator 132, and a predetermined length of the separator 132 is supplied to decrease the tension applied to the separator 132 such that the dancer unit 151 is rotated as much as the preset tension. When the preset tension is greater than the tension of the separator 132, the dancer unit 151 overcomes the tension of the separator 132 and rotates clockwise to pull a predetermined length of the separator 132 (the separator 132 between the mandrel 180 and the lower end of the dancer unit 151), and increases tension applied to the separator 132 such that the dancer unit 151 is rotated clockwise as much as the preset tension, thereby supplying the separator 132 with constant tension.

The operation of the dancer unit 151 will be described with reference to FIGS. 15(a) and 15(b).

The dancer unit 151 is light, and FIGS. 15(a) and 15(b) illustrate the shapes of the dancer unit 151, the separator dancer member 150, the mandrel 180, and the separator stacking unit 112 which rapidly reacts to the change of tension applied to the separator 132.

The dancer unit 151 performs work thereof while moving from the leftmost side to the right side in FIG. 15(a), and completes one cycle of work while moving the rightmost side to the left side in FIG. 15(b).

The dancer unit 151 performs work thereof while moving from the leftmost side to the right side in FIG. 15(a), and four separator dancer members 150 are illustrated at four different positions, and, for convenience, are referred to as ① separator dancer member 150, ② separator dancer member 150, ③ separator dancer member 150, and ④ separator dancer member 150.

The dancer unit 151 completes one cycle of work while moving the rightmost side to the left side in FIG. 15(b), and four separator dancer members 150 are illustrated at four different positions, and, for convenience, are referred to as ⑤ separator dancer member 150, ⑥ separator dancer member 150, ⑦ separator dancer member 150, and ⑧ separator dancer member 150 from the rightmost side to the left side.

FIGS. 15(a) and 15(b) illustrate the shapes of the dancer unit 151, the separator dancer member 150, the mandrel 180, and the separator stacking unit 112 when the dancer unit 151 rapidly reacts to the change of tension applied to the separator 132.

The dancer unit 151 performs work thereof while moving from the leftmost side to the right side in FIG. 15(a), and four separator dancer members 150 are illustrated at four different positions and, for convenience, are referred to as ① separator dancer member 150, ② separator dancer member 150, ③ separator dancer member 150, and ④ separator dancer member 150.

In FIG. 15(b), the dancer unit 151 completes one cycle of work while moving from the rightmost side to the left side, and four separator dancer members 150 are illustrated at four different positions and, for convenience, are referred to as ⑤ separator dancer member 150, ⑥ separator dancer member 150, ⑦ separator dancer member 150, and ⑧ separator dancer member 150 from the rightmost side.

The separator of the separator dancer member 150 moved to the leftmost of the stacking table starts at ① position of the separator stacking unit 112.

In this case, appropriate tension is preset in the spiral spring 165 by rotating the spring casing 164 with preset tension by the control knob 174, and thus appropriate tension is preset in the dancer unit 151 by the spring fixing shaft 168 connected with the dancer unit 151.

When a stacking work starts and the separator dance member 150 is moved from ① position of the separator stacking unit 112 to ② position thereof, the length of the separator 132 present between the mandrel 180 and the lower guide roller 155 is more decreased at ② position than at ① position, and the dancer unit 151 is rotated clockwise at ② position and pulls the excess of the separator 132 in accordance with the reaction speed of the dancer unit 151 to apply appropriate tension to the separator 132 such that constant tension is applied to the separator 132, and accordingly, the separator is seen to maintain constant tension.

When the separator dancer member 150 moves to ② position by moving from ① position to the right, the dancer unit 151 rapidly rotates clockwise such that the tension of the separator is not released due to the decrease of the required length of the separator, and pulls the excessive length of the separator to maintain appropriate tension thereof, and when the separator dancer member 150 moves to ③ position, the separator is supplied such that the dancer unit 151 maintains appropriate tension of the separator, and the separator dancer member 150 moves to ④ position, and thus a half cycle of the stacking of the separator is completed, and the separator 132 is pressed and fixed by the mandrel 180, and next, the separator dancer member 150 moves to ⑤, ⑥, ⑦, and ⑧ positions of FIG. 15(b), and thus one cycle of the stacking is completed. Even when the separator dancer member 150 moves from the rightest to the left and reaches at ⑥ position, the same phenomenon as a phenomenon occurring when the separator dancer member 150 is located at ② position occurs, and the dancer unit 151 rapidly reacts to maintain appropriate tension of the separator, thereby preventing the defects of a product.

Meanwhile, in another embodiment, the spring free end 165a 과 the spring fixing end 165b may be installed by swapping roles thereof, and in still another embodiment, the spring free end 165a and the spring fixing end 165b may be installed to rotate freely, and tension applied to the separator during the rotation of the dancer unit 151 and the elastic force of the spiral spring 165 may be brought in equilibrium so that the separator 132 can be moved while maintaining constant tension.

The dancer tension control unit 171 includes: a dancer fixed shaft 172 fixed elastically to the spring fixing shaft 168 via the spiral spring 165 and the spring casing 164 so as to control the elasticity of the spiral spring 165 installed in the tension elastic unit 161; the control knob 174 installed on the dancer fixed shaft 172 so as to rotate the dancer fixed shaft 172; a fixing gear 177 installed on the dancer fixed shaft 172 so as to maintain a rotated state of the dancer fixed shaft 172; and a fixing stopper 178 installed on an upper part of the fixing gear 177 so as to prevent rotation of the fixing gear 177 rotated by the control knob 174.

The dancer tension control unit 171 controls torque of the spiral spring 165, and the dancer fixed shaft 172 is elastically coupled to the spring fixing shaft 168 via the spiral spring 165 and the spring casing 164. That is, the spring fixing shaft 168 and the dancer fixing shaft 172 are coupled to each other at ends thereof through the spiral spring 165 and are configured to be moved by elastic force.

A key 173 is coupled to the dancer fixed shaft 172, and the control knob 174 is coupled to the dancer fixed shaft 172 by the key 173.

The control knob 174 is coupled to the dancer fixed shaft 172, and can control the tension of the spiral spring 165 by rotating the spiral spring 165 coupled elastically to the spring casing 164 coupled to the dancer fixed shaft 172, wherein a spring 175 is coupled to the inside of the control knob 174.

A fixture 176 is installed on the control knob 174 to prevent the removal of the spring 175, and the fixing gear 177 rotated by the dancer fixed shaft 172 is installed on one surface of the control knob 174, and the fixing stopper 178 is installed on the fixing gear 177 to prevent the rotation of the fixing gear 177, that is, the rotation of the dancer fixed shaft 172.

Furthermore, a tension indication plate 179 is installed on one surface of the fixing gear 177 such that the rotation state of the control knob 174 can be visually checked.

The control knob 174 of the dancer tension control unit 171 controls the tension of the spiral spring 165 by rotating the dancer fixed shaft 172.

The fixing stopper 178 is temporarily released to control the tension (or torque) of the spiral spring 165. When rotating the control knob 174 clockwise while the fixing stopper 178 is released, the dancer fixed shaft 172 is rotated clockwise and increases the elastic force of the spiral spring 165.

Accordingly, the elastic force of the spiral spring 165 is increased more than the elastic force of the spiral spring 165 at an initial state, and thus the dancer unit 151 can maintain the tension of the separator 132 with a stronger elastic force due to the increased elastic force of the spiral spring 165.

In addition, when rotating the control knob 174 counterclockwise while the fixing stopper 178 is released, the dancer fixed shaft 172 is rotated counterclockwise and decreases the elastic force of the spiral spring 165.

Accordingly, the elastic force of the spiral spring 165 is decreased more than the elastic force of the spiral spring 165 at the initial state, and thus the dancer unit 151 can maintain the tension of the separator 132 with weaker elastic force due to the decreased elastic force of the spiral spring 165.

Figure 16:
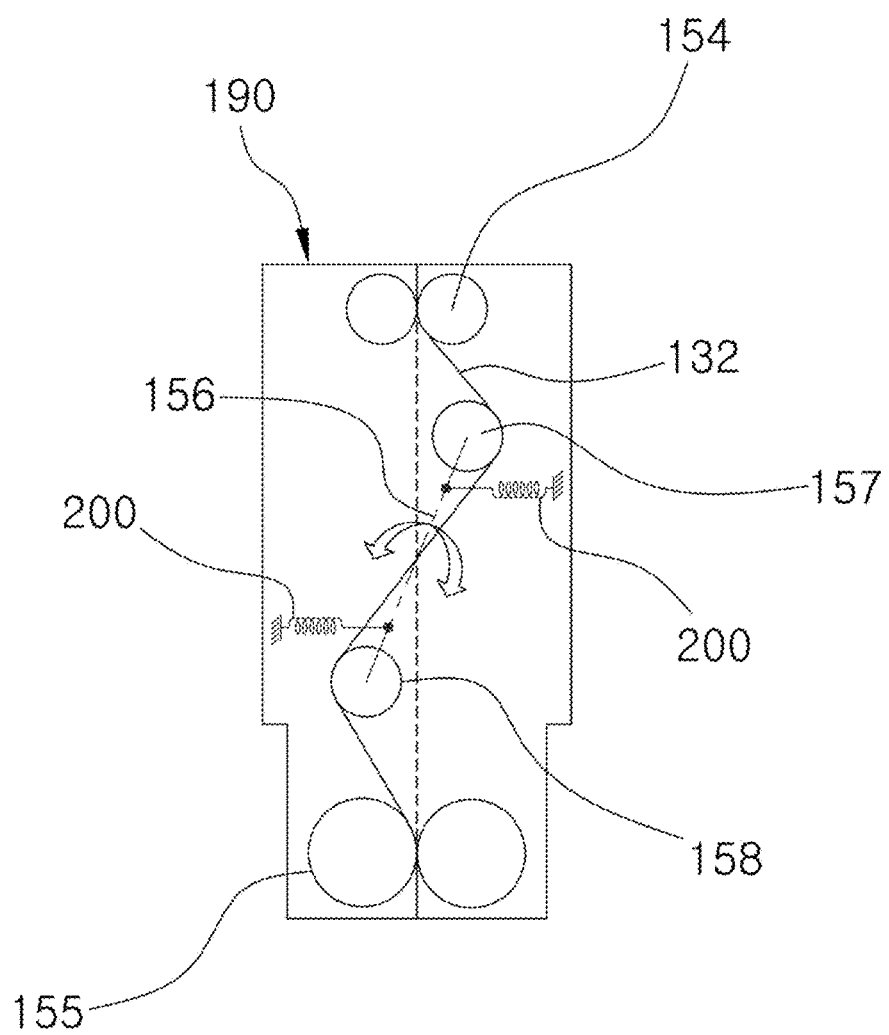
FIG. 16 is a view roughly illustrating a state in which a tension spring is mounted to the separator dancer member for stacking secondary batteries according to the exemplary embodiment of the present disclosure.
Figure 17:
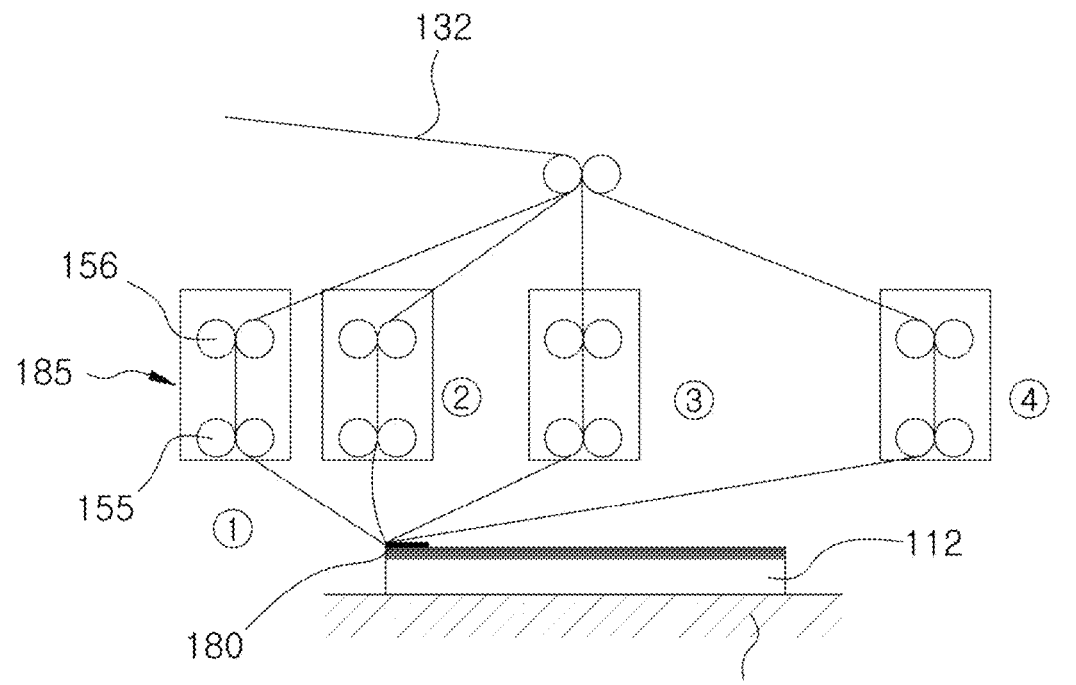
FIG. 17 is a view roughly illustrating the process of stacking a separator of a secondary battery of a conventional technology.
Figure 17:
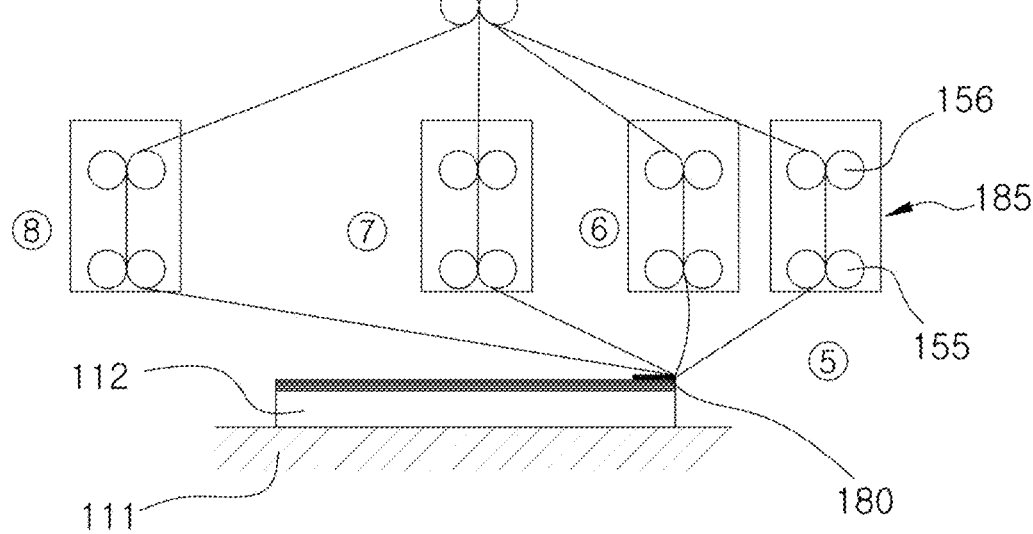

As still another embodiment, FIG. 16 is a view roughly illustrating a state in which a tension spring is mounted to the separator dancer member for stacking secondary batteries according to the exemplary embodiment of the present disclosure In order to supply the separator 132 while maintaining the constant tension of the separator 132, the separator 132 is guided in contact with the upper roller 157 and the lower roller 158 through the upper guide roller 154 and passes the lower guide roller 155 to reciprocate, and accordingly, the work of stacking the separator of a secondary battery is performed.

In this case, as for another configuration to maintain the tension of the separator, the tension spring 200 is mounted to the upper right side surface of the dancer fixing bracket 156, and another tension spring 200 is mounted to the lower left side surface of the dancer fixing bracket 156 such that the pair of tension springs 200 having equal tension is mounted thereto relative to the rotating shaft of the dancer fixing bracket 156, so the tension is in balance with torque applied to the upper roller 157 and the lower roller 158 from the separator 132.

The invention made by the present inventors has been described in detail according to the above embodiments, but the present invention is not limited to the above embodiments and various modifications may be made without departing from the gist of the present invention.

What is claimed is:

1. A separator tension control device for stacking a separator of a secondary battery, the device comprising:
   a separator stacking member (110) having: a separator stacking unit (112) installed on an upper surface of a table (111) such that negative and positive plates of a secondary battery are alternately stacked by a separator (132); and a fixing plate (114) which allows a separator supply member (130) and a separator dancer member (150) to be installed thereon;
   the separator supply member (130) installed on one side of the separator stacking unit (112) so as to supply the separator (132) to the separator stacking unit (112); and
   the separator dancer member (150) installed on an upper side of the separator stacking member (110) such that the separator (132) supplied from the separator supply member (130) is supplied with constant tension,
   wherein the separator supply member (130) comprises:
   a separator supply unit (131) which unwinds the separator (132) wound in a shape of a roll; and
   a tension control unit (141) installed on one side of the separator supply unit (131) so as to control tension of the separator (132) supplied to the separator dancer member (150), and
   wherein the separator supply unit (131) comprises:
   the separator (132) wound in a shape of a roll;
   an air shaft (133) installed rotatably on the fixing plate (114) such that the separator (132) is attached to and detached from the air shaft (133);
   a drive motor (134) installed on one side of the air shaft (133) so as to rotate the air shaft (133) at constant speed;
   a driving pulley (135) which transmits rotational force of the drive motor (134);
   a driven pulley (136) which receives rotational force of the driving pulley (135); and
   a first guide roller (138) and a second guide roller (139) installed by being spaced apart by a predetermined distance from the air shaft (133) to guide movement of the separator (132) unwound from the roll of the separator (132).

2. The device of claim 1, wherein the tension control unit (141) comprises:
   a fixing bracket (142) installed on the fixing plate (114);
   a cylinder (143) installed rotatably on the fixing bracket (142);
   a piston (144) installed in the cylinder (143) such that the piston (144) moves into and out of the cylinder (143);
   a rotating rod (145) installed to be rotated by the inward and outward movement of the piston (144);
   a rotating shaft (146) installed on the fixing plate (114) such that the rotating shaft (146) is rotated by the rotating rod (145);
   a pair of rotating brackets (147) installed on the rotating shaft (146); and
   a rotating roller (148) installed rotatably on the pair of rotating brackets (147).

3. The device of claim 1, wherein in the separator dancer member (150), a dancer unit (151) is rotated by the separator (132) and is rapidly restored, the dancer unit (151) being made of a lightweight carbon fiber material such that the dancer unit (151) is rapidly operated by compression force and restoring force of a spiral spring (165).

4. A separator tension control device for stacking a separator of a secondary battery, the device comprising:
   a separator stacking member (110) having: a separator stacking unit (112) installed on an upper surface of a table (111) such that negative and positive plates of a secondary battery are alternately stacked by a separator (132); and a fixing plate (114) which allows a separator supply member (130) and a separator dancer member (150) to be installed thereon;

the separator supply member (130) installed on one side of the separator stacking unit (112) so as to supply the separator (132) to the separator stacking unit (112); and the separator dancer member (150) installed on an upper side of the separator stacking member (110) such that the separator (132) supplied from the separator supply member (130) is supplied with constant tension, wherein the separator dancer member (150) comprises:

a dancer unit (151) installed on the fixing plate (114) such that the dancer unit (151) is rotated by a predetermined limited angle such that the separator (132) moved from the separator supply member (130) maintains constant tension;

a tension elastic unit (161) installed on one side of the dancer unit (151) such that the dancer unit (151) is rotated clockwise and counterclockwise by the predetermined limited angle by elasticity of the tension elastic unit (161) such that the tension of the separator (132) is maintained; and a dancer tension control unit (171) installed on one side of the tension elastic unit (161) such that the elasticity of the tension elastic unit (161) is controlled.

5. The device of claim 4, further comprising:

a cylinder containing compressed gas such that the dancer unit (151) is rotated clockwise and counterclockwise by the predetermined limited angle such that the tension of the separator (132) is maintained.

6. The device of claim 4, wherein the dancer unit (151) comprises:

a pair of dancer fixing plates (152) installed to be spaced apart by a predetermined distance from each other;

an upper guide roller (154) installed on upper parts of the pair of dancer fixing plates (152) such that the separator (132) is pulled horizontally by a predetermined distance by the rotation of the dancer unit (151);

a lower guide roller (155) installed on lower parts of the pair of dancer fixing plates (152) such that the separator (132) is pulled horizontally by a predetermined distance by the rotation of the dancer unit (151); and a dancer stopper (159) installed on the dancer fixing plate (152) such that the dancer unit (151) is rotated at the predetermined limited angle.

7. The device of claim 4, wherein the tension elastic unit (161) comprises:

an outer fixing bracket (162) installed a dancer fixing plate (152) of the dancer unit (151);

a spring casing (164) which is rotatably installed inside the outer fixing bracket (162) and has a spring fixing groove part (164a) such that a spring fixing end (165b) of a spiral spring (165) is coupled to the spring fixing groove part (164a);

the spiral spring (165) installed inside the spring casing (164) so as to rotate the dancer unit (151) by a limited angle; and a spring fixing shaft (168) having a spring fixing groove part (168a) such that a spring free end (165a) formed on an end of the spiral spring (165) is coupled to the spring fixing groove part (168a), the spring fixing shaft (168) being installed through the spiral spring (165) such that the spring fixing shaft (168) is rotated by the dancer tension control unit (171).

8. The device of claim 4, wherein the dancer tension control unit (171) comprises:

a dancer fixed shaft (172) fixed elastically to a spring fixing shaft (168) via a spiral spring (165) and a spring casing (164) so as to control elasticity of the spiral spring (165) installed in the tension elastic unit (161);

a control knob (174) installed on the dancer fixed shaft (172) so as to rotate the dancer fixed shaft (172);

a fixing gear (177) installed on the dancer fixed shaft (172) so as to maintain a rotated state of the dancer fixed shaft (172); and a fixing stopper (178) installed on an upper part of the fixing gear (177) so as to prevent rotation of the fixing gear (177) rotated by the control knob (174).

9. A separator tension control device for stacking a separator of a secondary battery, the device comprising:

a separator stacking member (110) having: a separator stacking unit (112) installed on an upper surface of a table (111) such that negative and positive plates of a secondary battery are alternately stacked by a separator (132); and a fixing plate (114) which allows a separator supply member (130) and a separator dancer member (150) to be installed thereon;

the separator supply member (130) installed on one side of the separator stacking unit (112) so as to supply the separator (132) to the separator stacking unit (112); and the separator dancer member (150) installed on an upper side of the separator stacking member (110) such that the separator (132) supplied from the separator supply member (130) is supplied with constant tension, wherein the separator dancer member (150) comprises:

a dancer unit (151) installed on the fixing plate (114) such that the dancer unit (151) is rotated by a predetermined limited angle such that the separator (132) moved from the separator supply member (130) maintains constant tension;

a dancer tension elastic unit (190) installed on one side of the dancer unit (151) such that the dancer unit (151) is rotated clockwise and counterclockwise by the predetermined limited angle by elasticity of the dancer tension elastic unit (190) such that the tension of the separator (132) is maintained; and a tension spring (200) installed on one side of the dancer tension elastic unit (190) such that the elasticity of the dancer tension elastic unit (190) is controlled.

10. The device of claim 9, wherein the tension spring (200) is mounted to an upper right side surface of a dancer fixing bracket (156), and another tension spring (200) is mounted to a lower left side surface of the dancer fixing bracket (156) such that the pair of tension springs (200) having equal tension is mounted thereto relative to a rotating shaft of the dancer fixing bracket (156), so the equal tension is in balance with torque applied to an upper roller (157) and a lower roller (158) from the separator (132).

* * * * *